US011764943B2

(12) United States Patent
Honorio Araujo da Silva et al.

(10) Patent No.: US 11,764,943 B2
(45) Date of Patent: Sep. 19, 2023

(54) METHODS AND SYSTEMS FOR SOMEWHAT HOMOMORPHIC ENCRYPTION AND KEY UPDATES BASED ON GEOMETRIC ALGEBRA FOR DISTRIBUTED LEDGER/BLOCKCHAIN TECHNOLOGY

(71) Applicant: Algemetric, LLC, Colorado Springs, CO (US)

(72) Inventors: David W. Honorio Araujo da Silva, Colorado Springs, CO (US); Carlos A. Paz de Araujo, Colorado Springs, CO (US); Hanes Barbosa Marques de Oliveira, Colorado Springs, CO (US); Marcelo Araujo Xavier, Dearborn, MI (US)

(73) Assignee: Algemetric, Inc., Colorado Springs, CO (US)

( * ) Notice: Subject to any disclaimer, the term of this patent is extended or adjusted under 35 U.S.C. 154(b) by 0 days.

(21) Appl. No.: 17/399,017

(22) Filed: Aug. 10, 2021

(65) Prior Publication Data

US 2022/0045840 A1    Feb. 10, 2022

Related U.S. Application Data

(60) Provisional application No. 63/063,719, filed on Aug. 10, 2020.

(51) Int. Cl.
*H04L 9/00* (2022.01)
*H04L 9/30* (2006.01)

(52) U.S. Cl.
CPC ............ *H04L 9/008* (2013.01); *H04L 9/3033* (2013.01); *H04L 9/3073* (2013.01); *H04L 9/50* (2022.05)

(58) Field of Classification Search
CPC ..... H04L 9/008; H04L 9/3033; H04L 9/3073; H04L 9/50
See application file for complete search history.

(56) References Cited

U.S. PATENT DOCUMENTS

| 4,405,829 A | 9/1983 | Rivest et al. |
| 5,751,808 A | 5/1998 | Anshel et al. |

(Continued)

FOREIGN PATENT DOCUMENTS

| CN | 107147484 A | 9/2017 |
| CN | 109831297 A | 5/2019 |

(Continued)

OTHER PUBLICATIONS

Wang, et al., "Discrete logarithm based additively homomorphic encryption and secure data aggregation", Information Sciences, 181, (2011), pp. 3308-3322.

(Continued)

*Primary Examiner* — Daniel B Potratz
(74) *Attorney, Agent, or Firm* — Christopher P. Whitham; Samuel M. Freund; Cochran Freund & Young LLC

(57) ABSTRACT

Disclosed are methods and systems to encrypt data with SomeWhat Homomorphic Encryption (SWHE) properties for submission to a distributed ledger/blockchain that allows further open operations retained in the distributed ledger/blockchain on the encrypted data that will be properly reflected when the encrypted result is decrypted by the data owner. The somewhat homomorphic properties include addition and scalar division. Also disclosed is an ability to update a secret key applied for a ciphertext such that a single piece of data may be provided on the distributed ledger/blockchain by a data owner to a new data owner without also exposing other data encrypted with the original secret key of the original data owner.

18 Claims, 3 Drawing Sheets

(56) References Cited

U.S. PATENT DOCUMENTS

| | | |
|---|---|---|
| 6,560,336 B1 | 5/2003 | Arita |
| 6,853,964 B1 | 2/2005 | Rockwood et al. |
| 8,452,975 B2 | 5/2013 | Futa et al. |
| 8,515,058 B1 | 8/2013 | Gentry |
| 8,719,324 B1 | 5/2014 | Koc et al. |
| 9,083,526 B2 | 7/2015 | Gentry |
| 9,716,590 B2 | 7/2017 | Gentry |
| 9,749,129 B2 | 8/2017 | Delerablee et al. |
| 9,906,360 B2 | 2/2018 | Johnson et al. |
| 2003/0223579 A1 | 12/2003 | Kanter et al. |
| 2005/0193012 A1 | 9/2005 | Matsayuma et al. |
| 2006/0179489 A1 | 8/2006 | Mas Ribes |
| 2007/0297614 A1 | 12/2007 | Rubin |
| 2008/0080710 A1 | 4/2008 | Harley et al. |
| 2009/0136033 A1 | 5/2009 | Sy |
| 2009/0282040 A1 | 11/2009 | Callaghan et al. |
| 2012/0140920 A1 | 6/2012 | Ghouti et al. |
| 2013/0254532 A1 | 9/2013 | Raykova et al. |
| 2013/0322537 A1 | 12/2013 | Rossato et al. |
| 2014/0140514 A1 | 5/2014 | Gentry |
| 2015/0039912 A1 | 2/2015 | Payton et al. |
| 2015/0100785 A1 | 4/2015 | Joye et al. |
| 2015/0170197 A1 | 6/2015 | Smith et al. |
| 2015/0295712 A1 | 10/2015 | Veugen |
| 2015/0381348 A1 | 12/2015 | Takenaka et al. |
| 2016/0105402 A1 | 4/2016 | Soon-Shiong et al. |
| 2016/0119119 A1 | 4/2016 | Calapodescu et al. |
| 2019/0044697 A1 | 2/2019 | Paz de Araujo et al. |
| 2019/0109701 A1 | 4/2019 | Paz de Araujo et al. |
| 2019/0164153 A1 | 5/2019 | Agrawal et al. |
| 2019/0386814 A1* | 12/2019 | Ahmed ............... H04L 9/008 |
| 2020/0028674 A1 | 1/2020 | Bao et al. |
| 2021/0065113 A1* | 3/2021 | Wynter ............ G06F 16/9024 |

FOREIGN PATENT DOCUMENTS

| | | |
|---|---|---|
| WO | 2012069747 A1 | 5/2012 |
| WO | 2014016795 A2 | 1/2014 |

OTHER PUBLICATIONS

International Search Report and Written Opinion for PCT/US2018/16000, International Searching Authority, dated Apr. 25, 2018, pp. 14 pages.

Extended European Search Report, PCT/US2017/045141, dated Nov. 22, 2019, 8 pages.

Kumar, Mohit, et al., "Efficient implementation of Advanced Encryption Standard (AES) for ARM based Platforms", 1st Int'l Conf. on Recent Advances in Information Technology, RAIT-20121, 2012, 5 pages.

Hitzer, Eckhard, et al., "Applications of Clifford's Geometric Algebra", Adv. Appl. Clifford Algebras 23, (2013), DOI 10.1007, pp. 377-404.

Non-Final Office Action, entitled, "Methods and Systems for Enhanced Data-Centric Additive Homomorphic Encryption Systems Using Geometric Algebra", dated Jan. 15, 2020.

Non-Final Office Action, entitled, "Methods and Systems for Enhanced Data-Centric Scalar Multiplicative Homomorphic Encryption Systems Using Geometric Algebra", dated Feb. 6, 2020.

Fau, et al., "Towards practical program execution over fully homomorphic encryption schemes", IEEE Computer Society, DOI 10.1109/3PGCIC, (2013), pp. 284-290.

Erkin, et al, "Generating private recommendations efficiently using homomorphic encryption and data packing", In: IEEE transactions on information forensics and security, vol. 7, No. 3, Jun. 2012, pp. 1053-1066.

Chatterjee et al., "Searching and Sorting of Fully Homomorphic Encrypted Data on Cloud", IACR Cryptology ePrint Archive, Oct. 10, 2015, pp. 1-14.

Emmadi et al., "Updates on sorting of fully homomorphic encrypted data", 2015 International Conference on Cloud Computing Research and Innovation (ICCCRI), Oct. 27, 2015, 6 pages.

The International Search Report and Written Opinion of the International Searching Authority, PCT/US2018/56154, dated Dec. 27, 2018, 25 pages.

The International Search Report and Written Opinion of the International Searching Authority, PCT/US2018/56156, dated Dec. 27, 2018, 23 pages.

The International Search Report and Written Opinion of the International Searching Authority, PCT/US2017/45141, dated Dec. 18, 2017, 7 pages.

The International Search Report and Written Opinion of the International Searching Authority, PCT/US2018/26305, dated Jul. 3, 2018, 7 pages.

The International Search Report and Written Opinion, for PCT/US21/40218, "Methods and Systems for Homomorphic Data Representation and Concealment Powered by Clifford Geometric Algebra", dated Oct. 1, 2021, 12 pages.

European Examination Report, for Application No. 17 837 619.0-18, entitled, Methods and Systems for Enhanced Data-Centric Encryption Systems Using Geometric Algebra, dated Mar. 18, 2021,10 pages.

James M. Chappell, et al., "The double-padlock problem: is secure classical information transmission possible without key exchange?", School of Electrical and Electronic Engineering, University of Adelaide, SA 5005, Australia, dated Dec. 31, 2012, 4 pages.

The International Search Report and Written Opinion, PCT/US2020/44808, "Methods and Systems for Encryption and Homomorphic Encryption Systems using Geometric Algebra and Hensel Codes", dated May 4, 2021, 18 pages.

The International Search Report and Written Opinion, PCT/US21/45453, "Methods and Systems for Somewhat Homomorphic Encryption and Key Updates Based on Geometric Algebra for Distributed Ledger/Blockchain Technology", dated Nov. 4, 2021, 7 pages.

The International Search Report and Written Opinion, PCT/US21/50994, "Methods and Systems for Distributed Computation Within a Fully Homomorphic Encryption Scheme Using P-Adic Numbers", dated Jan. 28, 2022, 7 pages.

David W.H.A. da Silva, "An Efficient Homomorphic Data Encoding with Multiple Secret Hensel Codes", International Journal of Information and Electronics Engineering, vol. 10, No. 1, Mar. 2002, 11 pages.

* cited by examiner

METHODS AND SYSTEMS FOR SOMEWHAT HOMOMORPHIC ENCRYPTION AND KEY UPDATES BASED ON GEOMETRIC ALGEBRA FOR DISTRIBUTED LEDGER/BLOCKCHAIN TECHNOLOGY

CROSS REFERENCE TO RELATED APPLICATIONS

This application is based upon and claims the benefit of U.S. provisional application Ser. No. 63/063,719, filed Aug. 10, 2020, entitled "Towards a Somehwat Homomorphic Key Update Protocol based on Clifford Geometric Algebra for Distributed Ledger Technology," all of which is also specifically incorporated herein by reference for all that it discloses and teaches.

BACKGROUND OF THE INVENTION

The advancement of science is possible when knowledge is shared and information is exchanged in a seamless manner. In a world where many businesses rely on information as their main assets, analysis over data is a crucial competitive advantage. Consequently, the amount of data processed and stored will continue to increase, creating a demand for virtualized services. To this end, some applications can be provided as cloud computing resources including Internet of Things (IoT), machine learning, virtual reality (VR) and blockchain. As a result, concerns about custody and privacy of data are on the rise.

Modern concealment/encryption employs mathematical techniques that manipulate positive integers or binary bits. Asymmetric concealment/encryption, such as RSA (Rivest-Shamir-Adleman), relies on number theoretic one-way functions that are predictably difficult to factor and can be made more difficult with an ever-increasing size of the encryption keys. Symmetric encryption, such as DES (Data Encryption Standard) and AES (Advanced Encryption Standard), uses bit manipulations within registers to shuffle the concealed text/cryptotext to increase "diffusion" as well as register-based operations with a shared key to increase "confusion." Diffusion and confusion are measures for the increase in statistical entropy on the data payload being transmitted. The concepts of diffusion and confusion in encryption are normally attributed as first being identified by Claude Shannon in the 1940s. Diffusion is generally thought of as complicating the mathematical process of generating unencrypted (plain text) data from the encrypted (cryptotext) data, thus, making it difficult to discover the encryption key of the concealment/encryption process by spreading the influence of each piece of the unencrypted (plain) data across several pieces of the concealed/encrypted (cryptotext) data. Consequently, an encryption system that has a high degree of diffusion will typically change several characters of the concealed/encrypted (cryptotext) data for the change of a single character in the unencrypted (plain) data making it difficult for an attacker to identify changes in the unencrypted (plain) data. Confusion is generally thought of as obscuring the relationship between the unencrypted (plain) data and the concealed/encrypted (cryptotext) data. Accordingly, a concealment/encryption system that has a high degree of confusion would entail a process that drastically changes the unencrypted (plain) data into the concealed/encrypted (cryptotext) data in a way that, even when an attacker knows the operation of the concealment/encryption method (such as the public standards of RSA, DES, and/or AES), it is still difficult to deduce the encryption key.

Homomorphic Encryption is a form of encryption that allows computations to be carried out on concealed cipher text as it is concealed/encrypted without decrypting the cipher text that generates a concealed/encrypted result which, when decrypted, matches the result of operations performed on the unencrypted plaintext.

The word homomorphism comes from the ancient Greek language: ktoc (homos) meaning "same" and μορφή (morphe) meaning "form" or "shape." Homomorphism may have different definitions depending on the field of use. In mathematics, for example, homomorphism may be considered a transformation of a first set into a second set where the relationship between the elements of the first set are preserved in the relationship of the elements of the second set.

For instance, a map f between sets A and B is a homomorphism of A into B if $$f(a_1 \ op \ a_2) = f(a_1) \ op \ f(a_2) | a_1, a_2 \in A$$

where "op" is the respective group operation defining the relationship between A and B.

More specifically, for abstract algebra, the term homomorphism may be a structure-preserving map between two algebraic structures such as groups, rings, or vector spaces. Isomorphisms, automorphisms, and endomorphisms are typically considered special types of homomorphisms. Among other more specific definitions of homomorphism, algebra homomorphism may be considered a homomorphism that preserves the algebra structure between two sets.

SUMMARY OF THE INVENTION

An embodiment of the present invention may comprise a method for performing somewhat homomorphic operations on encrypted data in a distributed ledger/blockchain system without decrypting the encrypted data and where data resulting from the somewhat homomorphic operations remains encrypted, the method comprising: generating off-chain by a data owner node device a secret/private key sk and a public evaluation key pk, wherein the secret/private key sk is comprised of a first key multivector ($\overline{K}_1$), a second key multivector ($\overline{K}_2$), and an integer g, and wherein the public evaluation key pk is comprised of a prime number q; encrypting off-chain by the data owner node device an integer message m as a function of at least one Geometric Algebra geometric product operation of the first key multivector ($\overline{K}_1$), the second key multivector ($\overline{K}_2$), and a message multivector ($\overline{M}$), and a scalar multiplication operation with integer g to obtain message ciphertext multivector ($\overline{C}$), wherein the message multivector ($\overline{M}$) is a representation of the integer message m; submitting on-chain by the data owner node device the message ciphertext multivector ($\overline{C}$) as a transaction for the distributed ledger/blockchain system; performing on-chain by a calculation node device at least one somewhat homomorphic operation with the message ciphertext multivector ($\overline{C}$) to calculate a result ciphertext multivector ($\overline{C}_R$), wherein a smart contract for the distributed ledger/blockchain defines available somewhat homomorphic operations and wherein the calculation node device is part of the same distributed ledger/blockchain system as the owner node device; and decrypting off-chain by the data owner node device the result ciphertext multivector ($\overline{C}_R$) as a function of at least one Geometric Algebra geometric product operation of an inverse of the first key multivector ($\overline{K}_1^{-1}$), an inverse of the second key multivector ($\overline{K}_2^{-1}$), the result ciphertext multivector ($\overline{C}_R$), and a scalar division operation with integer g to obtain a result multivector ($\overline{R}$), wherein the result multivector ($\overline{R}$) is a representation of a numeric result r.

An embodiment of the present invention may further comprise a distributed ledger/blockchain system that performs somewhat homomorphic operations on encrypted data without decrypting the encrypted data and where data resulting from the somewhat homomorphic operations remains encrypted, the distributed ledger/blockchain system comprising: a data owner node device, wherein the data owner node device further comprises: a key generation subsystem that generates, off-chain, a secret/private key sk and a public evaluation key pk, wherein the secret/private key sk is comprised of a first key multivector ($\overline{K}_1$), a second key multivector ($\overline{K}_2$), and an integer g, and wherein the public evaluation key pk is comprised of a prime number q; an encryption subsystem that encrypts, off-chain, an integer message m as a function of at least one Geometric Algebra geometric product operation of the first key multivector ($\overline{K}_1$), the second key multivector ($\overline{K}_2$), and a message multivector ($\overline{M}$), and a scalar multiplication operation with integer g to obtain message ciphertext multivector ($\overline{C}$), wherein the message multivector ($\overline{M}$) is a representation of the integer message m; a ciphertext submission subsystem that submits, on-chain, the message ciphertext multivector ($\overline{C}$) as a transaction for the distributed ledger/blockchain system; and a decryption subsystem that decrypts, off-chain, a result ciphertext multivector ($\overline{C}_R$) as a function of at least one Geometric Algebra geometric product operation of an inverse of the first key multivector ($\overline{K}_1^{-1}$), an inverse of the second key multivector ($\overline{K}_2^{-1}$), the result ciphertext multivector ($\overline{C}_R$), and a scalar division operation with integer g to obtain a result multivector ($\overline{R}$), wherein the result multivector ($\overline{R}$) is a representation of a numeric result r; and, a calculation node device, wherein the calculation node device further comprises: a somewhat homomorphic operation calculation subsystem that performs, on-chain, at least one somewhat homomorphic operation with the message ciphertext multivector ($\overline{C}$) to calculate a result ciphertext multivector ($\overline{C}_R$), wherein a smart contract for the distributed ledger/blockchain defines available somewhat homomorphic operations and wherein the calculation node device is part of the same distributed ledger/blockchain system as the owner node device.

DETAILED DESCRIPTION OF THE EMBODIMENTS

Figure 1:
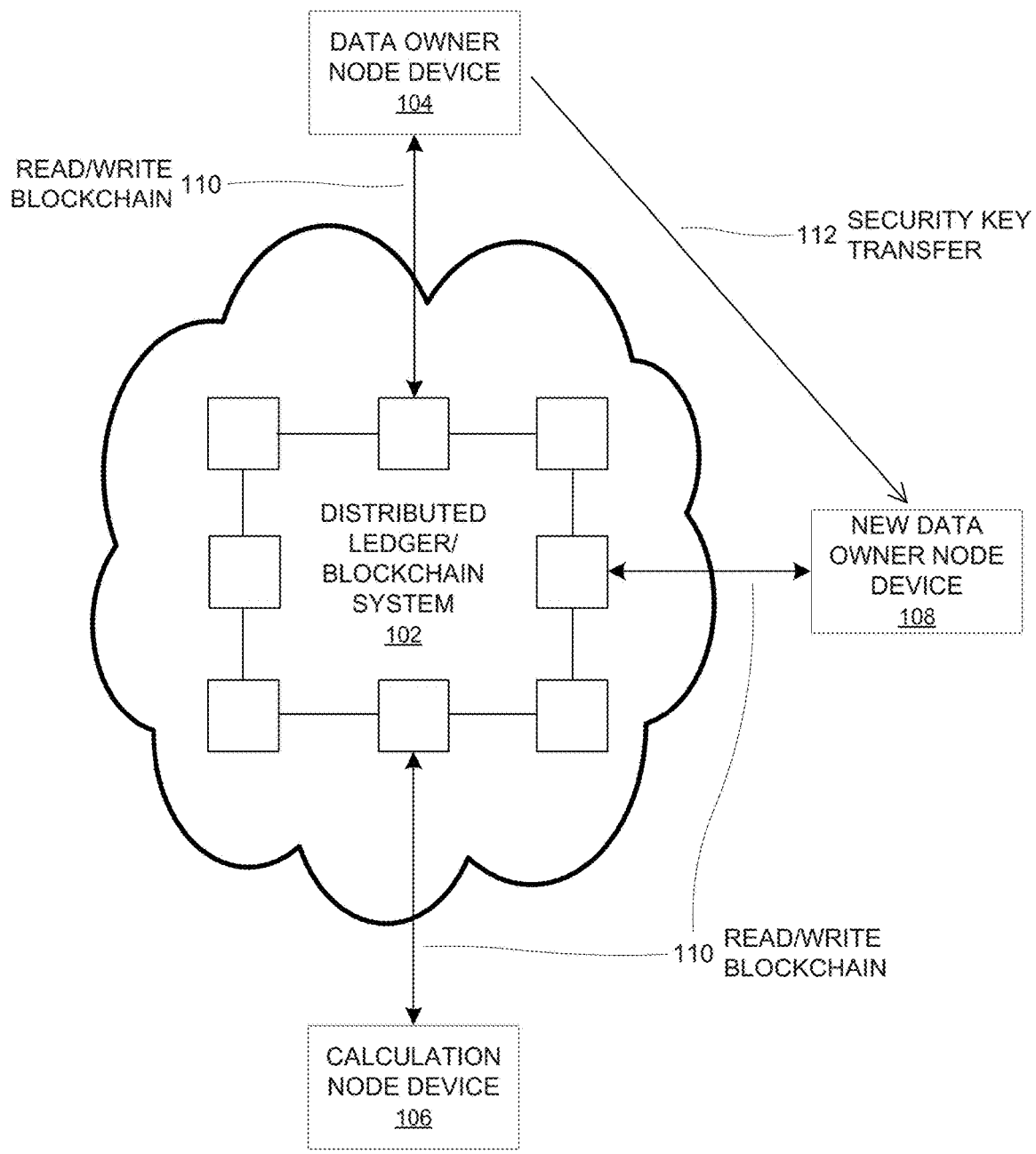
FIG. 1 is a block diagram of the hardware implementation for a SomeWhat Homomorphic Encryption (SWHE) distributed ledger/blockchain embodiment.

The various embodiments aim to address the challenge of expanding Blockchain Technologies (BT) by implementing a somewhat homomorphic encryption scheme that not only enables computation on encrypted data but also yields a key update protocol with which one can selectively reveal consolidated data from a blockchain application. Constructions of the various embodiments are meant to be compliant with the fundamental requirements of BT, including ownership control and non-repudiation. In isolation, BT and homomorphic encryption (HE) can both suffer from performance issues. Combining the two only escalates that risk. We rely on Clifford Geometric Algebra as the single algebraic structure for introducing efficient solutions for merging BT with HE. One target application considers a trusted environment with pre-screened parties, which allows the various embodiments to consider cryptographic solutions based on relaxed notions of security. One possible means of implementation is to encode the various embodiments using the Ruby language.

I. Introduction

Blockchain may be offered as a virtualized resource—Blockchain as a Service (BaaS). Blockchain has been used to reduce costs and the complexity of management, but blockchain raises concerns about the custody of data and the classical Trust Model.

Blockchain is a distributed ledger where the state lies on a linked list of interdependent blocks, persisted under consensus. Blockchain defines a conjunction of technologies behind Bitcoin, where anonymous parties would join a network without permission, so blockchain was initially considered permissionless. The replication of the information amongst participants was onerous. So new initiatives approached the state replication paradigm in a more efficient way, increasing throughput by different consensus mechanisms. Companies then employed the new Distributed Ledger Technology (DLT) concept to promote cooperation, on a premise of identified nodes (i.e., permissioned).

Private blockchains provide immutability and nonrepudiation, but blockchain has restrictive analysis over encrypted data when it is done without segregating information, participants or third-party trusted architectures. Public key cryptography is used in blockchain operations, but its limitations towards computability spawned a new race for Homomorphic Encryption (HE) schemes. Additionally, adversarial behaviors can arise in DLT environments from semi-honest partners, such as the use of shared data to leverage a commercial advantage. HE offers the ability to correctly evaluate encrypted data allowing the outsourcing of computation without loss of privacy. Thus, parties can agree on common scripts implementing HE prior to the operation over data assets.

A. The Problems

The various embodiments may be comprised of functional blocks, each of which may be tailored as described in more detail below according to objectives for scope, capability and security. The following sections provide a mathematical and numerical description of these functional blocks.

Exclusivity is ingrained in the meaning of data property and no repossession lawsuit can restore ownership of digital data once the digital data is shared. Moreover, a legal contract cannot prevent misbehavior, being only a prior agreement on posterior punitive actions. Consequently, under the expectancy of misconduct, companies may avoid cooperation even when contracts provide legal protection.

Conversely, a smart contract defines the behavior prior to an accordance between parties, resembling a legal preventive action that avoids undesired executions. If combined with HE, it can realize blind computations (i.e., big data analytics) where the entity performing the calculations does not know the results of the calculations without gaining permission from the data owner. Additionally, if improved with a homomorphic key update, it can offer a mechanism to transfer ownership without leaving the trusted environment.

Cloud computing became a very expensive structure to reproduce in-house and the market made providing cloud computing a premise to stay competitive. Therefore, blockchain, with its ever-growing database and inherent complexity, has an appeal to be used as a third-party service for storage and management. However, blockchain's philosophy is built on the concept of cryptographic proof instead of trust, which creates a conundrum and weakens the ability of the technology to remain trustworthy since cloud suppliers work under the assumption of reputation and legal agreements. Another competence of blockchains is the capability to share digital assets avoiding power imbalance between parties. Nevertheless, fearing a loss of ownership, companies may restrain themselves from sharing sensitive data that could favor analysis and leverage a commercial relationship or research effort.

In summary, cloud services bring uncertainty in the treatment of Confidentiality, Integrity, and Availability (CIA), whereas partnerships can be restrictive due to lack of trust or regulatory concerns. Therefore, the problems that the various embodiments are addressing in this disclosure includes the following issues.

Problem 1: Given an immutable ledger on a permissioned blockchain setting, provide an efficient privacy preserving smart contract for computing arithmetic functions over encrypted data without violating the principles of ownership (the legal right of data access) and non-repudiation (the assurance that one cannot deny the validity of the data).

Problem 2: Given a smart contract that solves Problem 1, provide the ability to transfer ownership of homomorphically encrypted data without revealing to non-owners anything that is supposed to be known only by data owners.

One of the motivations for Bitcoin was the avoidance of a single point of failure. Avoiding a single point of failure may mean the absence of a computational node due to censorship or a dishonest behavior from a participant. Therefore, publicizing transactions was a means to verify integrity, although secrecy was not a concern. User's anonymity was provided by public key encryption and cryptography took care of the trust for the model.

Furthermore, companies realized that their commercial relationships would benefit from the provenance given by the immutable tracking of events. Also, company partnerships are mediated by legal contracts, facilitating a transition to electronic scripts—smart contracts—when transacting digital assets. Therefore, the applicability of cryptography expands and problems such as data ownership become the main concern. On-chain solutions sometimes are based on the segregation of information or just under-covered data or scripts, not allowing computation or any kind of analytical result over encrypted assets. On the other hand, off-chain implementations can violate the credibility that is only earned when every operation is performed within public sight.

For the various embodiments, two main guidelines must be preserved in order to favor CIA and DLT core principles. First, any sensitive data must be encrypted or decrypted off-chain, in possession of the owner. Second, any operation over an encrypted asset must occur on-chain and the algorithm must be known by the parties and consequently agreed upon before execution. Finally, the script implementing the mathematical operations must be sufficiently efficient to not overload the performance of the consensus mechanism at hand.

C. Clifford Geometric Algebra

Clifford geometric algebra is known by the richness, robustness and flexibility of its algebraic structure, which allows us to take advantage of concepts from several different branches of mathematics such as vector and matrix spaces, integer, rational and complex arithmetic, all in a single compact system. Clifford Geometric Algebra (herein simplified to GA) is a very powerful mathematical system. Some advantages commonly associated with GA computing include compactness of algorithms, implicit use of parallelism and high runtime performance and robustness. In working on the various embodiments it was further noted that three major benefits of working with GA based would be: (1) the ability of working with notions from several different branches of mathematics in a single framework (i.e., modular arithmetic, complex arithmetic, matrix algebra, etc.); (2) how much may be accomplished by even a very small set of computationally inexpensive algebraic tools; and (3) the simplicity of the construction itself, which favors understanding, maintenance and analysis.

An embodiment may advantageously utilize Geometric Algebra to provide the encryption and decryption of numeric messages that may be stored and/operated on within the distributed ledger/blockchain. The use of Clifford Geometric Algebra (aka. Geometric Algebra) to provide the encryption and decryption provides the mathematical basis for the homomorphic operations of an embodiment.

Geometric Algebra is an area of mathematics that describes the geometric interaction of vectors and other objects in a context intended to mathematically represent physical interactions of objects in the physical world. As used herein, this area of mathematics encompasses Geometric Algebra, Conformal Geometric Algebra and Clifford Algebra (referred to collectively herein as "Geometric Algebra" or "GA"). Generally, Geometric Algebra defines the operations, such as geometric product, inverses and identities, which facilitate many features of the various embodiments disclosed herein. Further, Geometric Algebra allows for the organization and representation of data into the "payload" of a multivector where the data in the payload may represent, for example, plaintext, ciphertext, or identifying signatures. Consequently, the various embodiments make beneficial use of Geometric Algebra properties to provide encryption, decryption, and homomorphic operations in a relatively computationally simplistic manner while still providing robust security for both data in motion and data at rest (e.g., data stored in the Cloud).

It may be demonstrated that through multivector decompositions and a small subset of operations in the Clifford Geometric algebra it is possible to propose new methods for general-purpose data representation and data encryption with multivectors. The methods of the various embodiments may be used as part of the necessary reconciliation of data availability and privacy preservation. This is important because once data is encrypted, one cannot meaningfully process it, unless the encryption function is homomorphic with respect to one or more operations. Therefore, homomorphism is a key concern in constructions of the various embodiments since there is particular interest in encryption schemes that allow homomorphic computations over concealed data.

Some fields of applications are inherently complex, as is the case for blockchain technologies and cryptography. The combination of blockchain and cryptography could easily increase the associated complexity exponentially should one fail to take into account the additional complexity from any particular tool or approach. In scenarios like combining blockchain and cryptography, it seems critical to consider solutions that are simple to implement, but are still powerful, so one can achieve much without necessarily adding complexity. For the various embodiments GA seems to be an appealing candidate for providing an efficient cryptographic protocol that aims to expand blockchain capabilities without violating its rigid, but necessary, constraints.

Favoring the quick distinction of a multivector from any other data structure, we use capital letters with an overbar as in $\overline{M}$. We let the Clifford signature $C\ell(3, 0)$ generate a geometric product space here denoted by $\mathbb{G}_q^3$. A multivector is given by $\overline{M}=m_0\overline{e}_0+m_1\overline{e}_1+m_2\overline{e}_2+m_3\overline{e}_3+m_{12}\overline{e}_{12}+m_{13}\overline{e}_{13}+m_{23}\overline{e}_{23}+m_{123}\overline{e}_{123}$. The four grades of a multivector may be referred to as the scalar part $\langle \overline{M} \rangle_0=m_0\overline{e}_0$, the vector part $\langle \overline{M} \rangle_1=m_1\overline{e}_1+m_2\overline{e}_2+m_3\overline{e}_3$, the bivector part $\langle \overline{M} \rangle_2=m_{12}\overline{e}_{12}+m_{13}\overline{e}_{13}+m_{23}\overline{e}_{23}$, and the trivector or pseudoscalar part $\langle \overline{M} \rangle_3=m_{123}\overline{e}_{123}$. An example of a three-dimension (3D) multivector $\overline{A}$ that includes a scalar, a vector, a bivector, and a trivector is:

$$\overline{A}=a_0+a_1\overline{e}_1+a_2\overline{e}_2+a_3\overline{e}_3+a_{12}\overline{e}^{12}+a_{13}\overline{e}_{13}+a_{23}\overline{e}_{23}+a_{123}\overline{e}_{123}$$

where $\overline{e}_i$ is a unit vector along the i-axis and $\overline{e}_{12}$ represents the orientation of the area created by $a_{12}$. Notably, a Geometric Algebra multivector in N-space (i.e., a N-dimension multivector) has $2^N$ coefficients whereas a standard N-dimension vector has only N coefficients. Accordingly, the Geometric Algebra multivectors provide a sense of size, direction, and volume while a standard vector would only provide a sense of size and direction. As the concepts involved in Geometric Algebra are part of a deep and rich mathematical file, some general observations may be helpful to the description of the various embodiments disclosed herein, below. First, each of the $a_i$ values in the multivector $\overline{A}$ above may be "packed" with information and each $a_i$ value may range from zero to very large (e.g., >256,000 bits or an entire message). Secondly, the inverse of $\overline{A}$ when multiplied by $\overline{A}$ yields unity, or:

$$\overline{A}\overline{A}^{-1}=1$$

Thus, if a second multivector $\overline{B}$ is created and the geometric product $\overline{AB}$ is transmitted, then the destination can recover $\overline{B}$ through:

$$\overline{A}\overline{A}^{-1}\overline{B}=\overline{B}$$

Computations on the coefficients of $\overline{M}$ will be reduced to a given modulus q. This space reduced modulo q is denoted by $\mathbb{G}_q^3$ and, thus, we write $\overline{M} \in \mathbb{G}_q^3$. The multivector involutions reverse and Clifford conjugation are denoted by $\overline{M}^\dagger$ and $\overline{\overline{M}}$, respectively. The inverse of $\overline{M}^{-1}$ is computed as:

$$\overline{M}^{-1} = \frac{\overline{M}\left(\overline{M\overline{M}}\right)^\dagger}{\left(\overline{M\overline{M}}\right)\left(\overline{M\overline{M}}\right)^\dagger} \quad \text{Eq. 1}$$

such that $\overline{M}\overline{M}^{-1}=1$. For compactness, we denote a mod b by $|a|_b$. The expression $\lfloor a/c \rfloor_b$ reads "the floor division of a by c mod b". The multiplication of two multivectors $\overline{A}, \overline{B} \in \mathbb{G}_q^3$ follow the standard geometric product definition in $C\ell(3, 0)$ and have added that the computation for all coefficients is now reduced modulo q. The scalar multiplication for $\overline{A}\alpha$ for $\alpha \in \mathbb{Z}_q$ is computed by multiplying each coefficient of $\overline{A}$ by $\alpha$ modulo q. The scalar division A/a is computed by multiplying each coefficient of $\overline{A}$ by $x=\alpha^{-1}$ mod q where x is the modular multiplicative inverse of $\alpha$ with respect to q such that $\alpha x=1$ mod q. Thus, the following notations are equivalent: $\alpha^{-1}$ mod $q=|a^{-1}|_q=|1/\alpha|_q$.

As for the basic operations in $\mathbb{G}_q^3$, similar to the operations of a vector space, one can add, subtract, scalar multiply and scalar divide multivectors component-wise. Multiplication of multivectors is achieved with the geometric product, which is given by $\overline{AB}=\overline{A}\cdot\overline{B}+\overline{A}^\wedge\overline{B}$, where $\overline{A}\cdot\overline{B}$ is the Clifford dot product and $\overline{A}^\wedge\overline{B}$ is the Clifford wedge product.

D. Homomorphisms

Given two messages a, b, a function f is homomorphic with respect to a given operation $\circ$ if $f(a\circ b)=f(a)\circ f(b)$. When we represent the messages a, b as the multivectors $\overline{A}, \overline{B}$, we say that the function of this representation will be homomorphic with respect to $\circ$ if $f(\overline{A}\circ\overline{B})=f(\overline{A})\circ f(\overline{B})$. Homomorphic encryption is a form of encryption that allows computations to be carried out on cipher text as it is encrypted without decrypting the cipher text that generates an encrypted result, which, when decrypted, matches the result of operations performed on the unencrypted plaintext.

The essential purpose of homomorphic encryption is to allow computation on encrypted data without decrypting the data in order to perform the computation. In this way, the encrypted data can remain confidential and secure while the encrypted data is processed for the desired computation. Accordingly, useful tasks may be accomplished on encrypted (i.e., confidential and secure) data residing in untrusted environments. In a world of distributed computation and heterogeneous networking, the ability to perform computations on encrypted data may be a highly desirable capability. Hence, finding a general method for computing on encrypted data is likely a highly desirable goal for cryptography.

A sought-after application of homomorphic encryption may be for distributed ledger/blockchain systems. Encrypting blockchain stored data may mitigate the threat of data being compromised by a breach, but then the owners of the data would not then be able to perform operations (i.e., add, scalar divide, etc.) on the blockchain stored data. In order to perform operations on encrypted data stored in the blockchain, it would be necessary to download the encrypted blockchain stored data, recover/decrypt the data, perform all desired operations on the data locally, encrypt the resulting data and send the resulting data back to the blockchain. Alternatively, if a user wants another blockchain node to perform the computations, the other node would require access to the user's encryption/security keys. It is becoming increasing undesirable to provide others access to a user's security keys as the more entities that have access to the security keys inherently increases the susceptibility of the security keys to being breached, or even stolen by an unscrupulous user. Homomorphic encryption would allow the blockchain to operate on encrypted data without decryption, and without access to the client's security keys.

For the various embodiments, the "payload" may be packed in the values of the scalars and coefficients of the multivector elements. The packing method may define, among many things, the Geometric Algebra operations permissible for an embodiment. For example, the Rationalize operation on multivectors yields zero when all multivector coefficients are equal. Such multivectors having all equal coefficients have no inverse and the geometric product of such multivectors having all equal coefficients with another multivector has no inverse. Different aspects of the various embodiments, including the decryption methodology that utilizes the inverse of the security key(s) multivector to perform the decryption. Therefore, to avoid problems when performing an inverse operation, the various multivectors being utilized in the various embodiments should not have all equal value coefficients, unless specifically identified as being meant to be non-invertible.

II. Target Definitions

Before introducing our specifics of the constructions of the various embodiments to address the problems discussed in Section I-A, a definition of the general syntax and notions aimed to be achieved is presented. This is useful for many reasons including the ability if the desired goals are achieved, but also how well the goals are achieved.

A. SWHE Scheme

The syntax of a SomeWhat Homomorphic Encryption (SWHE) scheme is defined as follows:

Definition 1: A SWHE scheme denoted as:

$$\Pi = (Gen, Enc, Dec, Add, SDiv) \quad \text{Eq. 2}$$

is a tuple of efficient (i.e., probabilistic polynomial-time) algorithms with the syntax given by the following paragraphs.

Gen is a probabilistic polynomial-time key-generation algorithm that takes as input the security parameter $1^\lambda$ and outputs a private-key sk and a public evaluation key pk. The secret key implicitly defines a ring $\mathbb{R}$ that will serve as the message space. We write the syntax as $(sk, pk) \leftarrow Gen(1^\lambda)$. The security parameter is usually given in unary notation which indicates a $\lambda$-bit string of 1s so the efficiency of the algorithm is expected to be polynomial-time in $\lambda$.

Enc is a probabilistic polynomial-time encryption algorithm that takes as input a secret key sk and message m and outputs a ciphertext c as a n-dimensional tuple. We write the syntax as $c \leftarrow Enc(sk,c)$.

Dec is a deterministic polynomial-time encryption algorithm that takes as input a secret key sk and a ciphertext c and outputs a message m. We write the syntax as $m = Dec(sk,c)$.

Add is a deterministic polynomial-time addition algorithm that takes two ciphertexts $c_1$ and $c_2$ and outputs a ciphertext c which corresponds to the component-wise addition of $c_1$ and $c_2$ reduced modulo pk. We write the syntax as $c = Add(pk, c_1, c_2)$.

SDiv is a deterministic polynomial-time scalar division algorithm that takes a ciphertext $c_1$ and a scalar $\alpha$ and outputs a ciphertext c which corresponds to the scalar division of all elements of c by $\alpha$ reduced modulo pk. We write the syntax as $c = SDiv(pk, c_1, \alpha)$.

Correctness requires the following:

1) For all sk, pk output by Gen, and all $m \in \mathbb{R}$ we have $Dec(sk, Enc(sk, m)) = m$.

2) For all $c_i \leftarrow Enc(sk, m_i)$, i=1, 2 and all $\alpha \in \mathbb{R}$, the following holds:

$$Dec(sk, Enc(sk, Add(pk, c_1, c_2))) = m_1 + m_2,$$

$$Dec(sk, Enc(sk, SDiv(pk, c_1, \alpha))) = m_1/\alpha. \quad \text{Eq. 3}$$

Definition 2: A SWHE scheme $\Pi$ is secure if for a uniform $m \in \mathbb{R}$, all $(sk, pk) \leftarrow Gen(1^\lambda)$ and all $c \leftarrow Enc(sk,c)$, no efficient adversary A can recover m by knowing only pk and c.

B. Key Update Protocol

Definition 3: A key update protocol denoted as: Eq. 4

$$\Sigma = (TokGen, KeyUpd) \quad \text{Eq. 3}$$

is a tuple of efficient algorithms with the syntax given by the following paragraphs.

TokGen is a deterministic polynomial-time token generation algorithm that takes an old secret key $sk_{old}$ and a new secret key $sk_{new}$ and outputs a token t. We write the syntax as $t = TokGen(sk_{old}, sk_{new})$.

KeyUpd is a deterministic polynomial-time key update algorithm that takes a token t and a ciphertext $c_{old}$, previously encrypted with $sk_{old}$, and outputs a ciphertext $c_{new}$ that is encrypted with $sk_{new}$. We write the syntax as $c_{new} = KeyUpd(t, c_{old})$.

Definition 4: The key update protocol $\Sigma$ is secure if for all uniform $sk_{old}$ and $sk_{new}$ output by Gen $(1^\lambda)$ and t output by TokGen, the probability of any efficient adversary A to recover either $sk_{old}$ or $sk_{new}$ by knowing t, $c_{old}$ and $c_{new}$ is negligible.

III. Description of the SWHE Scheme

In this section we propose a construction for an embodiment that aims to satisfy the definitions in Section II-A. But first, let us introduce our motivation and a couple of useful remarks and definitions.

Motivation 1: We want to design a SWHE scheme that is secure based on the assumption that solving an underdetermined system of equations is computationally hard. In order to achieve this goal, we propose a design of an encryption function based on randomness and underdeterminancy. We want to transform a message m into a random multivector $\overline{M} \in G_q^3$ where a particular combination of addition and subtraction of its coefficients results in m, which implies that we have a different ciphertext even if we encrypt the same message multiple times. We also want to perform a modular multiplication using a secret factor, which implies that recovering m requires a modular multiplicative inverse operation with an unknown operand. Finally, we want to "seal" the randomly generated and modular displaced multivector with two secret key multivectors via a triple geometric product. In doing so, we expect to pose a challenge when attempting to recover a plaintext message from any give ciphertext, which is equivalent to solving a non-redundant underdetermined system of equations.

Motivation 2: We want to build an encryption scheme to be applied in a private (permissioned) blockchain among trusted parties. Thus, we are providing privacy in a trusted environment assuming that all the parties must follow a given protocol.

Remark 1: Due to Motivation 2, we assume that a relaxed threat model is in place where the adversary is not supposed to have any knowledge about the message that originated a given ciphertext. This allows us to propose an experimental and compact solution to solve Problems 1 and 2, as well as allowing us to introduce and discuss instances of a new approach for expanding BT capabilities with HE.

In Definition 1, the algorithm SDiv, for any useful result, might imply a fractional output. We will introduce a construction in which the encryption function receives positive integers as inputs and generates ciphertexts where the underlying computation is performed over the integers modulo a prime. Since Enc takes integers in $\mathbb{Z}_q$ as input and generates ciphertexts also over integers in $\mathbb{Z}_q$, the decryption function is expected to output integers in $\mathbb{Z}_q$. The algorithm Add performs homomorphic addition of ciphertexts and the decryption of the results is also an integer. However, in the specific case of SDiv, a ciphertext is divided by a scalar which might result in a non-integer rational number. The scalar division is performed over the integers, with the modular multiplicative inverse. In order to map the integer result of a scalar division to its corresponding rational representation we will use the Extended Euclidean Algorithm (EEA) according to Definition 5 below.

Definition 5: Given a prime p and a positive integer c ∈ $\mathbb{Z}_p$,
let the EEA be computed as follows:
1) Set $a_0=p$, $a_1=c$; $b_0=0$, $b_1=1$; $i=1$.
2) While $a_i > \lfloor \sqrt{p/2} \rfloor$ compute
$q = \lfloor a_{i-1}/a_i \rfloor$ $a_{i+1} = a_{i-1} - qa_i$
$b_{i+1} = b_{i-1} - qb_i$ $i=i+1$.
3) $a/b = a_i/b_i$
4) Return a/b. We write the syntax as a/b=EEA (p, c).

Now we are ready to introduce constructions that satisfy the definitions in II-A. Note that the following constructions take into account the bit size concerns of a computer program. Conceptually, the various embodiments are not limited by the bit size as the conceptual model may theoretically encompass infinite bit size values.

Gen takes as input $1^\lambda$ and proceeds as follows: (1) set $b=\lambda/8$; (2) let q be the smallest prime greater than 2b; (3) choose uniform 16 b-bit integers and define $\overline{K}_1, \overline{K}_2 \in \mathbb{G}_q^3$ such that the first 8 integers are the coefficients of $\overline{K}_1$ and the second 8 integers are the coefficients of $\overline{K}_2$—the generated $\overline{K}_1, \overline{K}_2$ must have an inverse otherwise other 16 b-bit integers must be uniformly chosen and transformed into the secret key multivectors $\overline{K}_1, \overline{K}_2$ until they have inverse; (4) choose a uniform b-bit integer g; and (5) output the secret key sk=($\overline{K}_1, \overline{K}_2$, g) and the public evaluation key pk=(b, q). The message space is originally defined by $\mathbb{R} = \mathbb{Z}_q$.

Enc takes as input sk=($\overline{K}_1, \overline{K}_2$, g) and m and proceeds as follows:
1) Let $m_0, : : :, m_{123}$, with the exception of $m_{12}$, be uniform b-bit integers and $m_{12}$ be defined as follows:

$$m_{12} = |-m_0 - m_1 + m_2 + m_3 - m_{13} + m_{23} + m_{123} + m|_q. \quad \text{Eq. 5}$$

2) For $j \in \{0, 1, 2, 3, 12, 13, 23, 123\}$, define $\overline{M}$ such that:

$$\overline{M} = \Sigma_j m_j \overline{e}_j. \quad \text{Eq. 6}$$

3) Compute $\overline{M}'$ such that $\overline{M}' = \overline{M}g$.
4) Compute and output $\overline{C} = \overline{K}_1 \overline{M}' \overline{K}_2$.

Dec takes as input sk=($\overline{K}_1, \overline{K}_2$, g) and $\overline{C} \in \mathbb{G}_q^3$ and proceeds as follows:
1) Retrieve $\overline{M}' = \overline{K}_1^{-1} \overline{C} \overline{K}_2^{-1}$.
2) Retrieve $\overline{M} = \overline{M}'/g$
3) Compute m such that:

$$m = |m_0 + m_1 - m_2 - m_3 + m_{12} + m_{13} - m_{23} - m_{123}|_q. \quad \text{Eq. 7}$$

4) Update the value m by mapping it to a rational format such that m=a/b=EEA(q, m). Output m.

Add takes as input pk and $\overline{C}_1, \overline{C}_2 \in \mathbb{G}_q^3$ and computes and outputs $\overline{C}$ as a component-wise addition of the coefficients of $\overline{C}_1, \overline{C}_2$.

SDiv takes as input pk, $\overline{C}_1 \in \mathbb{G}_q^3$ and a scalar $\alpha$ in $\mathbb{Z}_q$, and computes and outputs $\overline{C}$ as a scalar division of all elements in $\overline{C}_1$ by $\alpha$ which is denoted by $\overline{C}_1/\alpha$.

Lemma 1: For all uniformly generated coefficients of $m_j \in \mathbb{Z}_q$, where $j \in \{0, 1, 2, 3, 12, 13, 23, 123\}$, q is prime, and for all $m_{12}$ as defined in Eq. 5, the result in Eq. 7 holds.

Proof Given the definition of $m_{12}$ in Eq. 5, let's re-write Eq. 7 as $m = m_a + m_b$ such that:

$$m_a = m_0 + m_1 - m_2 - m_3 + m_{12}, \quad \text{Eq. 8}$$

$$m_b = m_{13} - m_{23} - m_{123}. \quad \text{Eq. 9}$$

If we substitute for mu in Eq. 8 we have:

$$m_a = m - m_{13} + m_{23} - m_{123}, \quad \text{Eq. 10}$$

so, when we compute $m_a + m_b$ adding Eqs. 9 and 10 we obtain:

$$m_a + m_b = m - m_{13} + m_{23} + m_{123} + m_{13} - m_{23} - m_{123} = m, \quad \text{Eq. 11}$$

Lemma 2: For any prime q, any non-zero $g \in \mathbb{Z}_q$ and any $\overline{M} \in \mathbb{G}_q^3$, we have $\overline{M}' = \overline{M}g$, $\overline{M}'/g = \overline{M}$.

Proof. For any prime q, all non-zero elements $g \in \mathbb{Z}_q$ have a unique modular multiplicative $x = |g^{-1}|_q$ such that $|gx|_q = 1$. When we compute $\overline{M}' = \overline{M}g$, we recover $\overline{M}$ by performing the scalar division of $\overline{M}'$ by g, denoted by $\overline{M}'/g$, which is in fact equivalent to the scalar multiplication of $\overline{M}'$ by $|g^{-1}|_q$. Since q is prime, for all g>0 we have a x such that $|gx|_q = 1$, where g, $x \in \mathbb{Z}_q$. According to the Bézout's identity, if gcd(g, q)=1, then we can write:

$$gx + gy = gcd(g, q) = 1, \quad \text{Eq. 12}$$

where x, y have integer solutions. We can then rewrite Eq. 12 as:

$$gx - 1 = (-y)q \text{ and } gx \equiv 1 \bmod q, \quad \text{Eq. 13}$$

and, thus, x is the modular multiplicative inverse of g with respect to q.

For small values of q one can naively compute x by iterating x from 1 to q−1 until finding the result that satisfies $|gx|_q = 1$. However, a better way is to use the Extended Euclidean Algorithm (EEA) which can efficiently compute modular multiplicative inverses for large values of g and q as long as gcd(g, q)=1.

Theorem 1: For all sk output by Gen and $m \in \mathbb{Z}_q$, we have Dec(sk, Enc(sk, m))=m.

Proof: Recall that in the definition of Gen, $\overline{K}_1, \overline{K}_2$ must have an inverse. Therefore, for all sk=($\overline{K}_1, \overline{K}_2$, g) and all m $\in \mathbb{Z}_q$, we obtain $\overline{M}'$ as $\overline{M}' = \overline{K}_1^{-1} \overline{C} \overline{K}_2^{-1}$. By applying Lemma 2, we recover $\overline{M}$ from $\overline{M}'$ and we recover m from $\overline{M}$ by applying Lemma 1.

Lemma 3: For all a, b $\in \mathbb{Z}_q$ that is transformed into $\overline{A}, \overline{B} \in \mathbb{G}_q^3$ according the first two steps in the Enc algorithm, decoding $\overline{A} + \overline{B}$ back to scalar in $\mathbb{Z}_q$ results in a+b and therefore the transformation of a, b into $\overline{A}, \overline{B}$ is homomorphic with respect to addition.

Proof: For all a, b $\in \mathbb{Z}_q$ that are represented by $\overline{A}, \overline{B} \in \mathbb{G}_q^3$, respectively, where the coefficients of $\overline{A}, \overline{B}$ are all uniform in $\mathbb{Z}_q$ with the exception of $a_{12}$ in $\overline{A}$ and $b_{12}$ in $\overline{B}$ which are both defined in Eq. 5. Let $\overline{S} = \overline{A} + \overline{B}$. The multivector addition is performed element-wise where $s_j = a_j + b_j$ for $j \in \{0, 1, 2, 3, 13, 23, 123\}$. For the particular case of $s_{12} = a_{12} + b_{12}$ we have:

$$s_{12} = a - a_0 - a_1 + a_2 + a_3 - a_{13} + a_{23} + a_{123} + b - b_0 - b_1 + b_2 - b_3 - b_{13} + b_{23} + b_{123}. \quad \text{Eq. 14}$$

If we organize the coefficients of $\overline{S}$ as:

$$s_a = a_0 + b_0 - a_2 - a_3 + b_0 + b_1 - b_2 - b_3 \quad \text{Eq. 15}$$

$$s_b = s_{12}$$

$$s_c = a_{13} - a_{23} - a_{123} + b_{13} - b_{23} - b_{123},$$

we compute $s_a + s_b$ to obtain:

$$s_a + s_b = a - a_{13} + a_{23} + a_{123} + b - b_{13} + b_{23} + b_{123} \quad \text{Eq. 16}$$
$$= a + b - s_c$$

so, essentially, computing $s_a + s_b + s_c$ gives $s_a + s_b + s_c = a + b$.

Lemma 4: Lemma 2 also applies to scalar multiplication and scalar division of all $\overline{A}, \overline{B} \in \mathbb{G}_q^3$ by all scalar $g \in \mathbb{Z}_q$. Recall that scalar division by g mod q is a scalar multiplication by $g^{-1}$ mod q. A multivector scalar multiplication holds the properties of additivity in the scalar and additivity in the (multi)vector [44], and, therefore, we have:

$$\overline{A}g + \overline{B}g = (\overline{A} + \overline{B})g. \qquad \text{Eq. 17}$$

Lemma 5: For all prime q, $\overline{C}_1 \leftarrow \text{Enc}(sk, m)$ and $\alpha \in \mathbb{Z}_u$ where $u = \lfloor \sqrt{q/2} \rfloor$, the following holds:

$$m/\alpha = \text{Dec}(sk, \text{SDiv}(pk, \overline{C}_1, \alpha)). \qquad \text{Eq. 18}$$

Proof. On the encrypted domain, where computation is performed modulo q, for q is a prime, the scalar division of $\overline{C}_1$ by $\alpha$ is achieved via the scalar multiplication of $\overline{C}_1$ by the modular multiplicative inverse of $\alpha$ with respect to q. If we let $\overline{C} = \text{SDiv}(pk, \overline{C}_1, \alpha)$, the decryption of $\overline{C}$ will result on the integer representation of m divided by $\alpha$, that is, $|m\alpha^{-1}|_q$. Since the definition of Dec in Section III requires a rational output in order to accommodate the results from computation including SDiv, we need to use the EEA in Definition 5 to achieve this goal. If we let $c = |m\alpha^{-1}|_q$, the EEA, whose standard implementation computes all the convergents of c/q, will output the first convergent of c/q whose numerator satisfies $a_i \leq u$ (according to the modified version presented in Definition 5), for $u = \lfloor \sqrt{q/2} \rfloor$. This result implies $c = m/\alpha$. To prove this equivalence, we can rewrite m as a Diophantine equation where there is an integer solution fork such that $m = \alpha c + kq$. We can now write the solution fork as $k = (m - \alpha c)/q$. It is clear that $c = (m - kq)/\alpha$ and since $(m - kq)$ mod $q = m$ then we have $c \equiv m/\alpha$ mod q.

Due to Lemma 5, and since we assume that homomorphic scalar divisions will always occur, in order to guarantee the desired result of scalar divisions over encrypted data, we reduce the message space originally defined as $\mathbb{Z}_q$ in Gen by $\mathbb{Z}_u$, for $u = \lfloor \sqrt{q/2} \rfloor$.

Theorem 2: For all (sk, pk) output Gen, $\overline{C}_1, \overline{C}_2 \in \mathbb{G}_q^3$, and $m_1, m_2, \alpha \in \mathbb{Z}_q$, the following holds:

$$\text{Dec}(sk, \text{Add}(pk, \text{Enc}(sk, m_1), \alpha)) = m_1 \cdot \alpha. \qquad \text{Eq. 19}$$

and $$\text{Dec}(sk, \text{Add}(pk, \text{Enc}(sk, m_1), \text{Enc}(sk, m_2))) = m_1 + m_2, \qquad \text{Eq. 20}$$

Proof Given $m_1, m_2, \alpha \in \mathbb{Z}_q$, $sk = (\overline{K}_1, \overline{K}_2, g)$, and $pk = q$, we compute $\overline{C}_1, \overline{C}_2 \in \mathbb{G}_q^3$ as follows:

$$\overline{C}_1 = \text{Enc}(sk, m_1), \overline{C}_2 = \text{Enc}(sk, m_2). \qquad \text{Eq. 21}$$

We compute $\overline{C} = \text{Add}(pk, \overline{C}_1, \overline{C}_2)$. When decrypting $\overline{C}$ we have:

$$\begin{aligned} \text{Dec}(sk, \overline{C}) &= \overline{K}_1^{-1} \overline{C} \overline{K}_2^{-1} \\ &= \overline{K}_1^{-1} (\overline{C}_1 + \overline{C}_2) \overline{K}_2^{-1} \\ &= \overline{K}_1^{-1} \overline{C}_1 \overline{K}_2^{-1} + \overline{K}_1^{-1} \overline{C}_2 \overline{K}_2^{-1} \\ &= \overline{K}_1^{-1} \overline{K}_1 \overline{M}_1' \overline{K}_2 \overline{K}_2^{-1} + \overline{K}_1^{-1} \overline{K}_1 \overline{M}_2' \overline{K}_2 \overline{K}_2^{-1} \\ &= \overline{M}_1' + \overline{M}_2'. \end{aligned} \qquad \text{Eq. 22}$$

By applying Lemma 3 ad 4, we obtain $m_1 + m_2$. Similarly, let $\overline{C} = \text{SDiv}(pk, \overline{C}_1, \alpha)$, then:

$$\begin{aligned} \text{Dec}(sk, \overline{C}) &= \overline{K}_1^{-1} \overline{C} \overline{K}_2^{-1} \\ &= \overline{K}_1^{-1} \overline{C}_1 \alpha^{-1} \overline{K}_2^{-1} \\ &= \overline{K}_1^{-1} \overline{K}_1 \overline{M}_1' \overline{K}_2 \overline{K}_2^{-1} \alpha^{-1} \\ &= \overline{M}_1' \alpha^{-1}. \end{aligned} \qquad \text{Eq. 23}$$

By applying Lemma 3, 4 and 5, we obtain $m_1/\alpha$.

Theorem 3: If an adversary $\mathcal{A}$ can efficiently solve a system of equations with 8 non-redundant equations and 24 unknowns then $\mathcal{A}$ can efficiently recover m from $\overline{C}$ without knowing anything other than $\overline{C}$.

Proof: Let a multivector $\overline{A} \in \mathbb{G}_q^3$ be written as:

$$\overline{A} = \langle A \rangle_0 + \langle A \rangle_1 + \langle A \rangle_2 + \langle A \rangle_3 \qquad \text{Eq. 24}$$

where $\langle \cdot \rangle_i$, for $i \in \{0,1,2,3\}$, is called a multivector grade. Grades 0 and 3 contain a single element each and grades 1 and 2 contain three elements each, for a total of 8 elements.

Given $\overline{C} \in \mathbb{G}_q^3$ such that $\overline{C} = \overline{K}_1 \overline{M}' \overline{K}_2$, we can write $\overline{C} = \sum_{i=0}^{3} \langle \overline{K}_1 \overline{M}' \overline{K}_2 \rangle_i$. Similarly, if one wants to recover $\overline{M}'$ they need to compute $\overline{M}' = \overline{K}_1^{-1} \overline{C} \overline{K}_2^{-1} = \sum_{i=0}^{3} \langle \overline{K}_1^{-1} \overline{C} \overline{K}_2^{-1} \rangle_i$.

Assuming the adversary $\mathcal{A}$ only knows $\overline{C}$, an attack to recover $\overline{M}$ from $\overline{C}$ can be formulated by solving a system of equations on the form of:

$$\langle \overline{C} \rangle_i = \langle \overline{K}_1 \overline{M}' \overline{K}_2 \rangle_i, \qquad \text{Eq. 25}$$

where each element of $\overline{C}$ can be computed from a combination of the elements of $\overline{K}_1, \overline{M}'$ according to the rules of the geometric product, for a total of 8 equations. Since $\overline{K}_1, \overline{M}'$, and $\overline{K}_2$ are unknowns, and each also have a total of 8 elements, the adversary $\mathcal{A}$ is faced with a total of 24 unknown variables. This means that the system of equations the adversary needs to solve in order to recover $\overline{M}'$ from $\overline{C}$ is considered an underdetermined system, i.e., a system that has less equations than unknowns. As for any underdetermined system, the number of basic variables is given by the number of equations, thus we have $24 - 8 = 16$ free variables. Therefore, the system has as an infinite number of solutions for as many values that the free variables can take.

Lemma 6: The proposed SWHE Scheme is secure assuming that no adversary $\mathcal{A}$ can efficiently solve (that is, solve under polynomial-time) an underdetermined system of equations which its underdeterminancy is not affected by the number of ciphertexts samples under consideration.

Proof: Given $\overline{C}_1 = \text{Enc}(sk, m_1)$, $\overline{C}_2 = \text{Enc}(sk, m_2)$, and $\overline{C} = \text{Add}(pk, \overline{C}_1, \overline{C}_2)$, an adversary A may try to solve for $\overline{M}'_1$ and $\overline{M}'_2$ and/or simply $\overline{M}' = \overline{M}'_1 + \overline{M}'_2$, by organizing a system of equations as in Eq. 25, such that:

$$\langle \overline{C} \rangle_i = \langle \overline{K}_1 \overline{M}_1 \overline{K}_2 \rangle_i \qquad \text{Eq. 26}$$

$$\langle \overline{C} \rangle_i = \langle \overline{K}_1 \overline{M}_2 \overline{K}_2 \rangle_i$$

$$\langle \overline{C} \rangle_i = \langle \overline{K}_1 \overline{M}' \overline{K}_2 \rangle_i.$$

The system would then have a total of 24 equations (8 for each cyphertext) and 32 unknowns if solving for both $\overline{M}'_1$ and $\overline{M}'_2$, or 24 unknowns if solving for $\overline{M}'$. However, notice that:

$$\langle \overline{C} \rangle_i = \langle \overline{K}_1 \overline{M}' \overline{K}_2 \rangle_i = \langle \overline{K}_1 \overline{M}'_1 \overline{K}_2 \rangle_i + \langle \overline{K}_1 \overline{M}'_2 \overline{K}_2 \rangle_i = \langle \overline{K}_1 (\overline{M}'_1 + \overline{M}'_2) \overline{K}_2 \rangle_i, \qquad \text{Eq. 27}$$

i.e., the 8 equations with respect to the elements of $\overline{C}$ are generated as a sum of the equations with respect to $\overline{C}_1$ and $\overline{C}_2$, and, therefore, are redundant, which reduces the total number of non-redundant equations to 16. Hence, the resulting system, despite solving for both $\overline{M}'_1$ and $\overline{M}'_2$, or $\overline{M}'$ only, is underdetermined and can have an infinite number of solutions. Similarly, if we compute $\overline{C}$=SDiv(pk, $\overline{C}_1$, α), then:

$$\langle \overline{C} \rangle_i = \langle \overline{K}_1 \overline{M} \overline{K}_2 \rangle_i = \langle \overline{K}_1 (\overline{M}'_1 \alpha^{-1}) \overline{K}_2 \rangle_i = \alpha^{-1} \langle \overline{K}_1 \overline{M}'_1 \overline{K}_2 \rangle_i. \quad \text{Eq. 28}$$

Notice that the equations for the elements of $\overline{C}$ are the result of $\alpha^{-1}$ multiplied by the equations with respect to the elements of $\overline{C}_1$, and hence are redundant. Therefore, the resulting systems of equations for the scalar division case has a total of 8 nonredundant equations and 24 unknowns, which turns out to be an underdetermined system with an infinite number of possible solutions.

IV. Description of the Key Update Protocol

In this section we propose a construction that aims to satisfy the definitions presented in Section II-B.

Motivation 3: We want to design a key update protocol that securely allows one to update the secret key of an existing ciphertext without revealing the corresponding message, the old key or the new key, also based on the assumption that solving a non-redundant underdetermined system of equation is computationally hard. In order to achieve this goal, we propose a design for a protocol based on underdeterminancy. From the old and the new key, we want to generate a token that is expected to not reveal information about either the old or the new key. Once the token is generated, one should be able to use it for changing the keys on an existing ciphertext under the old key, generating a new ciphertext under the new key. In this process, one should not be able to derive the underlying plaintext message.

TokGen takes as input two secret keys $sk_1=(\overline{K}_{11}, \overline{K}_{12}, g_1)$ and $sk_2=(\overline{K}_{21}, \overline{K}_{22}, g_2)$, the old and the new key, respectively, and computes and returns the token $t=(\overline{T}_1, \overline{T}_2)$ such that $\overline{T}_1=\overline{K}_{21}\overline{K}_{11}^{-1}g_1^{-1}g_2$, $\overline{T}_2=\overline{K}_{12}^{-1}\overline{K}_{22}$.

KeyUpd takes as input the token $t=(\overline{T}_1, \overline{T}_2)$ and an existing (old) ciphertext $\overline{C}_{old}$ and computes and outputs an updated (new) ciphertext $\overline{C}_{new}$ as $\overline{C}_{new}=\overline{T}_1\overline{C}_{old}\overline{T}_2$.

Theorem 4: For all $sk_1$ and $sk_2$ output by Gen, and all $\overline{T}_1$ and $\overline{T}_2$ output by TokGen, given that $\overline{C}$ is a ciphertext such that:

$$\overline{C}_{old}=\overline{K}_{11}\overline{M}_{old}\overline{K}_{12}, \overline{M}_{old}=\overline{M}'g_1, \quad \text{Eq. 29}$$

it holds: $\overline{C}_{new}=\overline{K}_{21}\overline{M}_{new}\overline{K}_{22}$, $\overline{M}_{new}=\overline{M}'g_2$.

Proof Given the setup in Theorem 4, we verity that:

$$\begin{aligned}\overline{C}_{new} &= \overline{T}_1\overline{C}_{old}\overline{T}_2 \quad \text{Eq. 30}\\ &= \overline{K}_{21}\overline{K}_{11}^{-1}g_1^{-1}g_2\overline{K}_{11}\overline{M}'g_1\overline{K}_{12}\overline{K}_{12}^{-1}\overline{K}_{22}i\\ &= \overline{K}_{21}\overline{M}'g_2\overline{K}_{22}\\ &= \overline{K}_{21}\overline{M}_{new}\overline{K}_{22}.\end{aligned}$$

Theorem 5: If an adversary A can efficiently solve a system of equations with more unknowns than non-redundant equations then A can efficiently recover m from $\overline{C}_{new}$.

Proof Given a token $t=(\overline{T}_1, \overline{T}_2)$ computed according to TokGen, $\overline{C}_{old}=\overline{K}_{11}\overline{M}'\overline{K}_{12}=\overline{K}_{11}\overline{M}g_1\overline{K}_{12}$ computed according to Enc, and $\overline{C}_{new}=\overline{T}_1\overline{C}_{old}\overline{T}_2$ computed according to KeyUpd, an adversary $\mathcal{A}$, with knowledge of $\overline{C}_{old}$, t, and $\overline{C}_{new}$, may try to solve for $\overline{M}$, and consequently obtain m according to Dec, by organizing a system of equations on the form of:

$$\langle \overline{C}_{old} \rangle_i = \langle \overline{K}_{11}\overline{M}g_1\overline{K}_{12} \rangle_i \quad \text{Eq. 31}$$

$$\langle \overline{C}_{new} \rangle_i = \langle \overline{T}_1\overline{C}_{old}\overline{T}_2 \rangle_i$$

$$\langle \overline{T}_1 \rangle_i = \langle \overline{K}_{21}\overline{K}_{11}^{-1}g_1^{-1}g_2 \rangle_i$$

$$\langle \overline{T}_2 \rangle_i = \langle \overline{K}_{12}^{-1}\overline{K}_{22} \rangle_i$$

Notice that this system of equations contains a total of 32 equations (8 equations for each of the multivectors $\overline{C}_{old}$, $\overline{C}_{new}$, $\overline{T}_1$, and $\overline{T}_2$) and 42 unknowns (40 related to the multivectors $\overline{K}_{11}$, $\overline{K}_{12}$, $\overline{K}_{21}$, $\overline{K}_{22}$, and $\overline{M}$, and 2 related to the scalars $g_1$ and $g_2$. Therefore, the system is considered underdetermined as the number of unknowns surpasses the number of nonredundant equations.

Theorem 6: If an adversary $\mathcal{A}$ can efficiently solve a system of equations with 8 non-redundant equations and 16 unknowns then $\mathcal{A}$ can efficiently recover $sk_1$ or $sk_2$ from t.

Proof: The proof of Theorem 6 can be borrowed from the proof of Theorem 5, as the same system of equations and its characteristics apply in this case.

V. Application

In order to provide practical insights on how to connect the proposed constructions to a real-world DLT-based system, we introduce an illustrative design where we apply our SWHE scheme and key update protocol. In our example we describe an instance of the data ownership problem, where regulatory restrictions reduce the solution space for data computation. Due to space limitations, we cannot fully describe the system internals in all its details (i.e., consensus mechanism for persisting data), so we will provide a minimally required high level description of its building blocks.

Motivation 4: $300 billion out of more than $1.7 trillion are spent annually on medical research alone [47] and advancements depend on the reproducibility of experiments and the scientific correctness underlying it. Moreover, healthcare systems operate under strict regulations [48] in order to protect the secrecy of patients, resulting in a very siloed industry [18]. In such scenario, blockchain technologies have the potential to mediate the access to healthcare data [49], avoiding power imbalance over digital assets. With the addition of HE, a DLT system can protect the privacy of individuals' Electronic medical records (EMRs) while offering compliant analysis over their data.

Definition 6: This blockchain application is composed by the building blocks described in the following paragraphs.

User $\mathcal{U}_A$: The original data owner. Responsible for persisting information on-chain and the one that decides when and to whom the ownership is transferred.

User $\mathcal{U}_B$: An existing user from the same consortium of User $\mathcal{U}_A$. User $\mathcal{U}_B$ has access to the off-chain cryptographic library and can perform homomorphic computations on-chain at any time. User $\mathcal{U}_B$ is interested in getting insights of data processed at the blockchain.

App component $\mathcal{U}_C$: Software that works as an interface between the user and the SWHE scheme and the key update protocol. The App component $\mathcal{U}_C$ imports the algorithms Gen, Enc, and Dec from the SWHE scheme and the TokGen from the key update protocol.

Blockchain component $\mathcal{B}_C$: A system composed by the ledger (the blockchain database) and a smart contract that controls the access to the ledger. The smart contract imports Add, SDiv from the SWHE scheme and KeyUpd from the key update protocol.

Definition 7: $\mathcal{B}_C$ is a tuple with the following efficient algorithms: NewRecord, GetRecords, GenReport, GenResult, GetReport and GetResult, as described in the following paragraphs.

GenReport generates a report calculating the median of a given number of records. We write the syntax as GenReport ($id_{SLedger}$), and operates as follows:
1) First, GetRecords is called, retrieving the records represented by $ids_{Ledger}$;
2) Then, Add operates the addition of multivectors inside the records returned by GetRecords;
3) SDiv takes all summed multivectors given by Add and divides by the number of records returned by GetRecords; and,
4) Finally NewRecord is used to persist the aggregated data.

GenResult takes as input an id, $id_{Ledger}$, and the generated tokens t to update the keys of a report. We write the syntax as GenResult ($id_{Ledger}$; t), and operates as follows:
1) First, GetReport is called, retrieving the report of $id_{Ledger}$;
2) Second, KeyUpd is used to change the keys of report $id_{Ledger}$; and,
3) Finally, NewRecord is used to persist the resulting data.

GetResult takes as input $id_{Ledger}$ and retrieves a report that had its keys updated. We use the syntax GetResult ($id_{Ledger}$).

Example 1: In our example, $\mathfrak{U}_A$ represents a hospital that owns patients' records. $\mathfrak{U}_B$ stands for a research institution that wants to make analysis over patients' data. The medical industry runs under strict regulation and health institutions are forbidden to share personal information from individuals. However, a disease outbreak urged the aforementioned organizations to cooperate. Therefore, the hospital agreed to share information under a security protocol, that could lead to a better triage of patients and, perhaps, a path to a cure.

In the DLT environment, both institutions will have a copy of the data, but their ownership is tied to their keys. Since the smart contract is using a SWHE scheme, computations can be performed homomorphically by $\mathfrak{U}_B$ and the property over the resulting analysis can be transferred through the key update protocol by $\mathfrak{U}_A$.

$\mathfrak{U}_B$ wants to calculate the average number of pre-existing conditions of every patient that died from the new illness. Therefore, $\mathfrak{U}_B$ generates a report over a selection of expired patients. Then, $\mathfrak{U}_A$ analyzes the result and decides to grant permission. To do so, a symmetric key is shared with $\mathfrak{U}_B$ through a traditional key exchange protocol. Now, $\mathfrak{U}_A$ updates the keys of the report, allowing $\mathfrak{U}_B$ to finally detect a high number of pre-existing conditions in patients that did not recover.

VI. Conclusions

Through practical constructions of the various embodiments the realization of a somewhat homomorphic encryption (SWHE) scheme is demonstrated and a key update protocol as a strategy for expanding the current capabilities of blockchain technologies (BT) is also demonstrated. With a very small set of elementary functions found in Clifford geometric algebra, the various embodiments are able to provide simple and yet efficient cryptographic protocols to equip BT with a homomorphic smart contract. Without violating current business logic constraints in BT, one can use constructions of the various embodiments to homomorphically analyze encrypted data, generate reports and transfer the data ownership without compromising the original key holder's and/or third parties' privacy. The disclosure further provides evidence of the various embodiments' proposed algorithms' correctness as well as the security properties the algorithms carry, under some strong assumptions such as the attacker's knowledge restricted to public information.

Hardware Implementation for Data Concealment Embodiments (FIG. 1)

FIG. 1 is a block diagram 100 of the hardware implementation for a SomeWhat Homomorphic Encryption (SWHE) distributed ledger/blockchain embodiment. The distributed ledger/blockchain system 102 provides for data storage with the principles of ownership and non-repudiation inherent to a distributed ledger/blockchain system. The data owner node device 104, calculation node device 106, and new data owner node device 108 are members of the distributed ledger/blockchain system 102. The data owner node device 104, calculation node device 106, and new data owner node device 108 read/write data 110 from/to the distributed ledger/blockchain system 102. The data owner node 104 may encrypt data and write/submit the encrypted data for storage on the blockchain system 102. The calculation node device 106 may perform somewhat homomorphic operations on the encrypted data supplied by the data owner node device 104, such as adding two ciphertexts from the data owner node device 104 together or dividing a ciphertext by a scalar, all while the data and results remain encrypted during the entire operation. The data owner node device 104 may decrypt ciphertext data owned by the data owner node device 104 as desired. The new data owner node 108 may be given ownership of a ciphertext owned by the data owner node device 104 using a key update protocol that will update the encryption key of the ciphertext to a new encryption key. The new encryption key will be transferred 112 to the new data owner node device 108 so the new data owner may now decrypt the data with the updated security key, but not the old data with the original security stored on the blockchain 102 by the data owner node device 104.

Further, generally, any computing device capable of communication over any form of electronic network or bus communication platform may be one, two or all three of the node devices 104-108 shown in FIG. 1. Additionally, the data owner node device 104, the calculation node device 106, and the new data owner node device 108 may actually be the same physical computing device communicating over an internal bus connection with itself, but still desiring to conceal transferred data to ensure that an attacker cannot monitor the internal communications bus to obtain sensitive data communications in an unconcealed format.

Various embodiments may implement the network/bus communications channel for the blockchain system 102 using any communications channel capable of transferring electronic data. For instance, the network/bus communication connection may be an Internet connection routed over one or more different communications channels during transmission between the node devices 104-108 and the blockchain system 102. Likewise, the network/bus communication connection may be an internal communications bus of a computing device, or even the internal bus of a processing or memory storage Integrated Circuit (IC) chip, such as a memory chip or a Central Processing Unit (CPU) chip. The network/bus communication channel may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the node computing devices 104-108. The node computing devices 104-108 may each be a computer or computer system, or any other electronic devices device capable of performing the communications and computations of an embodiment. The node computing devices 104-108 may include, but are not limited to: a general purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Notably, the first 102 and/or second 104 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Figure 2:
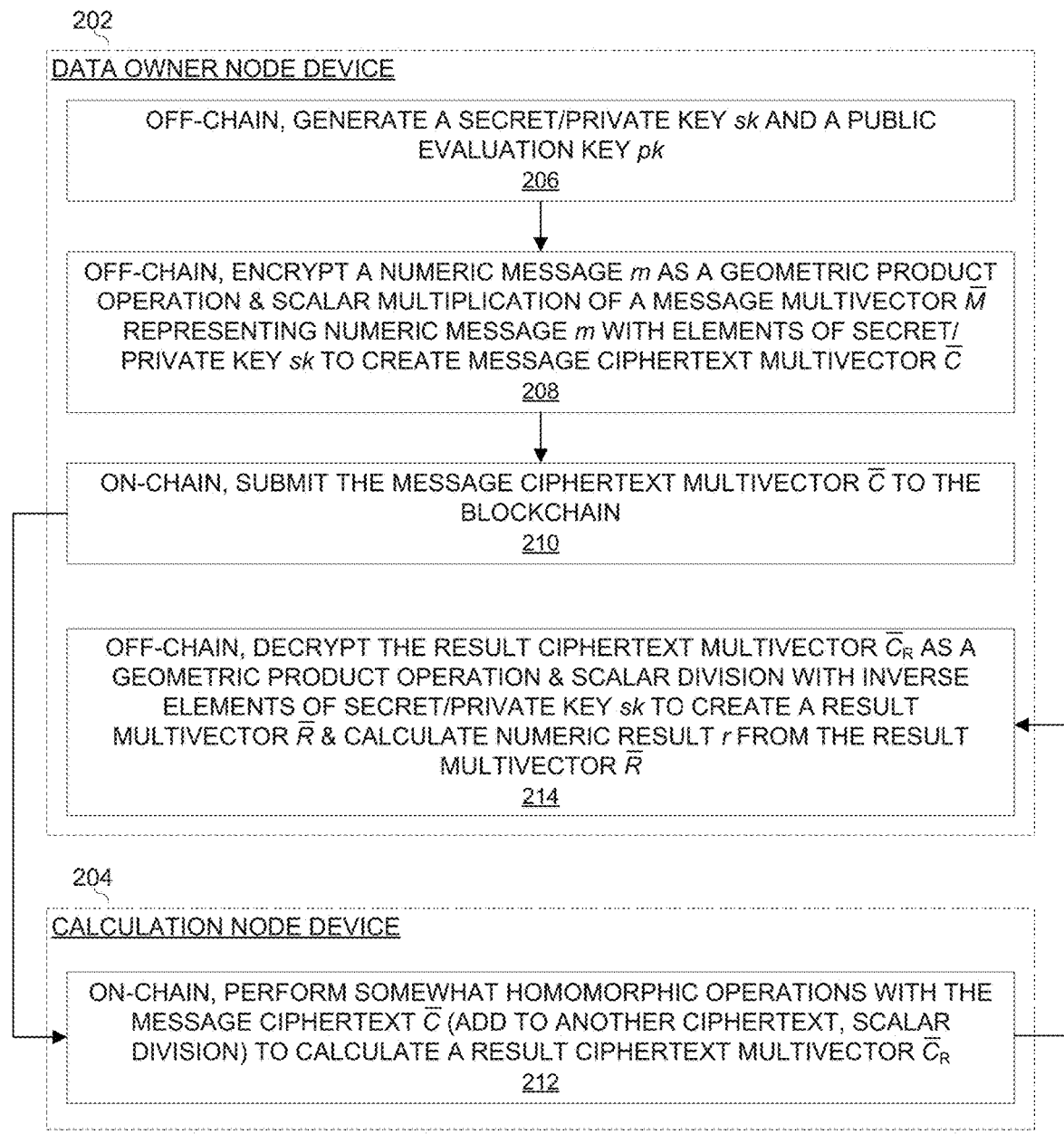
FIG. 2 is a flow chart of encryption/decryption and somewhat homomorphic calculations for an embodiment.

Operational Flow Chart for Encryption/Decryption and SWHE Calculations for an Embodiment (FIG. 2)

FIG. 2 is a flow chart 200 of encryption/decryption and somewhat homomorphic calculations for an embodiment. At off-chain process 206, the data owner node device 202 generates a secret/private key sk and a public evaluation key pk. At off-chain process 208, the data owner node device 202 encrypts a numeric message m as a geometric product operation and a scalar multiplication of a message vector $\overline{M}$ with elements of the secret/private key sk ($\overline{K}_1$, $\overline{K}_2$, g) to create message ciphertext multivector $\overline{C}$. The message multivector $\overline{M}$ represents the numeric message m. At on-chain process 210, the data owner node device 202 submits the message ciphertext $\overline{C}$ to the blockchain. At on-chain process 212, the calculation node device 204 performs somewhat homomorphic operations with the message ciphertext $\overline{C}$ (add another ciphertext, scalar division) to calculate a result ciphertext multivector $\overline{C}_R$. At off-chain process 214, the data owner node 202 decrypts the result ciphertext multivector $\overline{C}_R$ as a geometric product operation and scalar division with inverse elements of the secret/private key sk to create a result multivector $\overline{R}$ and calculates a numeric result r from the result multivector $\overline{R}$.

Figure 3:
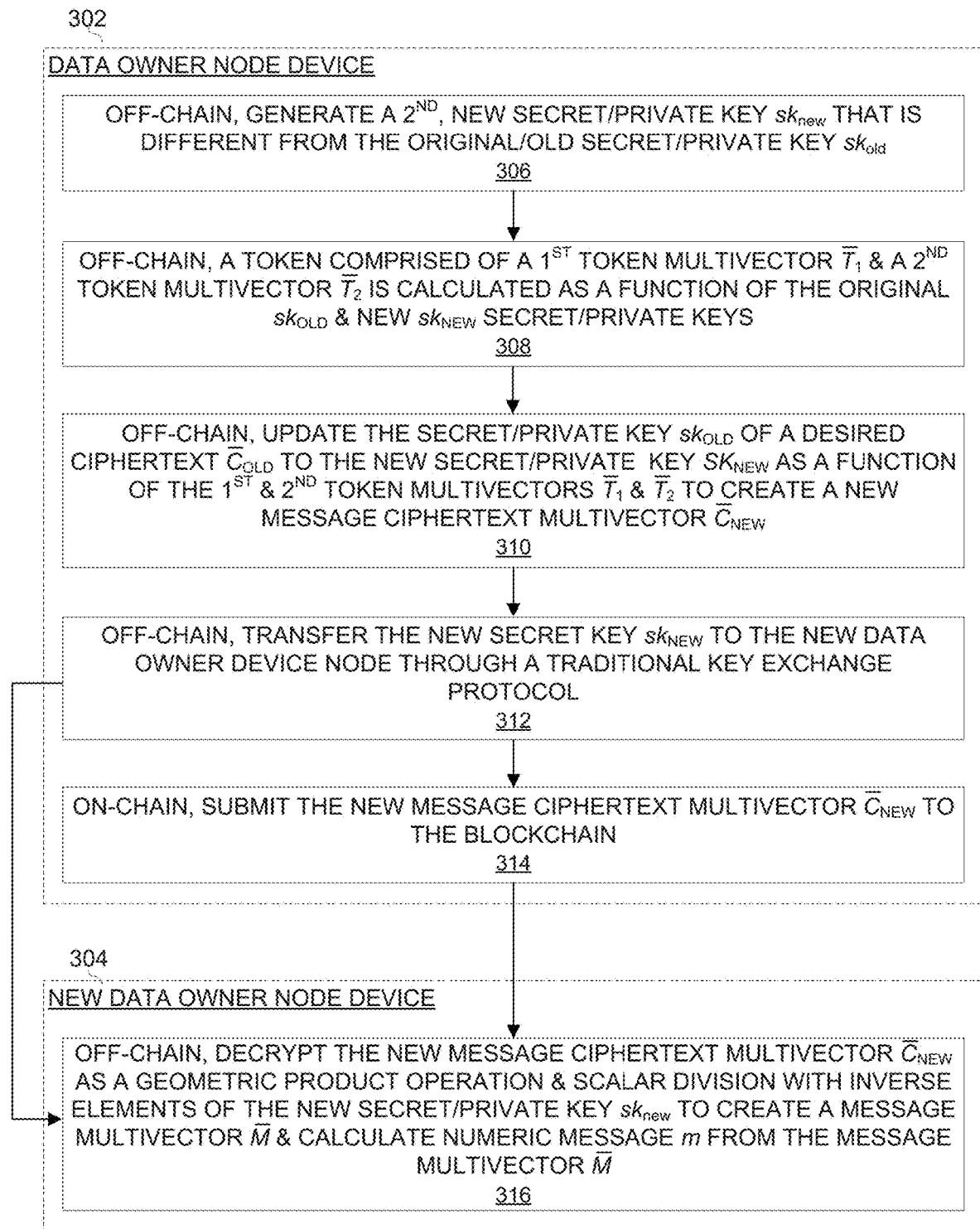
FIG. 3 is a flow chart of a key update operation for an embodiment.

Operational Flow Chart for Key Update Operation for an Embodiment (FIG. 3)

FIG. 3 is a flow chart 300 of a key update operation for an embodiment. At off-chain process 306, the data owner node device 302 generates a second, new secret/private key sknew that is different from the original/old secret private key $sk_{old}$. At off-chain process 308, a token comprised of a first token multivector $\overline{T}_1$ and a second token multivector $\overline{T}_2$ is calculated as a function of the original $sk_{old}$ and new $sk_{new}$ secret private keys. At off-chain process 310, the data owner device node 302 updates the secret/private key $sk_{old}$ of a desired ciphertext $\overline{C}_{old}$ to the new secret/private key $sk_{new}$ as a function of the first and second token multivectors $\overline{T}_1$ and $\overline{T}_2$ to create a new message ciphertext multivector $\overline{C}_{new}$. The process 300 of FIG. 3 may be done for any ciphertext owned by the data owner node device including the message ciphertext $\overline{C}$ as well as the somewhat homomorphic calculation result ciphertext $\overline{C}_R$. At off-chain process 312, the data owner node device 302 transfers the new secret key $sk_{new}$ to the new data owner node device 304 through a traditional key exchange protocol. At on-chain process 314, the data owner node device 302 submits the new ciphertext multivector $\overline{C}_{new}$ to the blockchain. At off-chain process 316, the new data owner node device 304 decrypts the new ciphertext multivector $\overline{C}_{new}$ as a geometric product operation and scalar division with inverse elements of the new secret/private key $sk_{new}$ to create a message multivector $\overline{M}$ and calculates a numeric message m from the message multivector $\overline{M}$.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

What is claimed is:

1. A method for performing somewhat homomorphic operations on encrypted data in a distributed ledger/blockchain system without decrypting said encrypted data and where data resulting from said somewhat homomorphic operations remains encrypted, the method comprising:

generating off-chain by a data owner node device a secret/private key sk and a public evaluation key pk, wherein said secret/private key sk is comprised of a first key multivector ($\overline{K}_1$), a second key multivector ($\overline{K}_2$), and an integer g, and wherein said public evaluation key pk is comprised of a prime number q;

encrypting off-chain by said data owner node device an integer message m as a function of at least one Geometric Algebra geometric product operation of said first key multivector ($\overline{K}_1$), said second key multivector ($\overline{K}_2$), and a message multivector ($\overline{M}$), and a scalar multiplication operation with integer g to obtain message ciphertext multivector ($\overline{C}$), wherein said message multivector ($\overline{M}$) is a representation of said integer message m;

submitting on-chain by said data owner node device said message ciphertext multivector ($\overline{C}$) as a transaction for said distributed ledger/blockchain system;

performing on-chain by a calculation node device at least one somewhat homomorphic operation with said message ciphertext multivector ($\overline{C}$) to calculate a result ciphertext multivector ($\overline{C}_R$), wherein a smart contract for said distributed ledger/blockchain defines available somewhat homomorphic operations and wherein said calculation node device is part of said same distributed ledger/blockchain system as said owner node device; and decrypting off-chain by said data owner node device said result ciphertext multivector ($\overline{C}_R$) as a function of at least one Geometric Algebra geometric product operation of an inverse of said first key multivector ($\overline{K}_1^{-1}$), an inverse of said second key multivector ($\overline{K}_2^{-1}$), said result ciphertext multivector ($\overline{C}_R$), and a scalar division operation with integer g to obtain a result multivector ($\overline{R}$), wherein said result multivector ($\overline{R}$) is a representation of a numeric result r.

2. The method of claim 1:
wherein said process of generating off-chain by said data owner node device a secret/private key sk and a public evaluation key pk further comprises:
  setting said prime number q equal to a prime number;
  randomly generating 16 integer values;
  setting a first 8 of said 16 integer values as coefficient values of said first key multivector ($\overline{K}_1$), wherein said first key multivector ($\overline{K}_1$) has an inverse;
  setting a last 8 of said 16 integer values as coefficient values of said second key multivector ($\overline{K}_2$), wherein said second key multivector ($\overline{K}_2$) has an inverse;
  setting said integer g to a random integer value;
  setting said secret/private key sk to be said first key multivector ($\overline{K}_1$), said second key multivector ($\overline{K}_2$), and said integer g; and
  setting said public evaluation key to be said prime number q;
wherein said process of encrypting off-chain by said data owner node device said integer message m to obtain message ciphertext multivector ($\overline{C}$) further comprises:
  setting coefficients of said message multivector ($\overline{M}$) equal to random integer values except for a $m_{12}$ coefficient of said message multivector ($\overline{M}$);
  calculating said $m_{12}$ coefficient of said message multivector ($\overline{M}$) as a function of said other coefficients of said message multivector ($\overline{M}$) and said integer message m modulo prime number q ($m_{12}=|-m_0-m_1+m_2+m_3-m_{13}+m_{23}+m_{123}+m|_q$);
  calculating a transitional message multivector ($\overline{M}'$) as a scalar multiplication of said integer g and said message multivector ($\overline{M}$) ($\overline{M}'=\overline{M}g$); and
  calculating said message ciphertext multivector ($\overline{C}$) as a geometric product of said first key multivector ($\overline{K}_1$), said transitional message multivector ($\overline{M}'$) and said second key multivector ($\overline{K}_2$) ($\overline{C}=\overline{K}_1\overline{M}'\overline{K}_2$); and
wherein said process of decrypting off-chain by said data owner node device said result ciphertext multivector ($\overline{C}_R$) further comprises:
  calculating a transitional result multivector ($\overline{R}'$) as a geometric product of said inverse of said first key multivector ($\overline{K}_1^{-1}$), said transitional result multivector ($\overline{R}'$) and said inverse of said second key multivector ($\overline{K}_2^{-1}$) ($\overline{R}'=\overline{K}_1^{-1}\overline{C}_R\overline{K}_2^{-1}$);
  calculating a result multivector ($\overline{R}$) as a scalar division of said integer g and said transitional result multivector ($\overline{R}'$) by said integer g ($\overline{R}=\overline{R}'/g$);
  calculating said numeric result r as a function of coefficients of said result multivector ($\overline{R}$) modulo prime number q ($r=|r_0+r_1-r_2-r_3+r_{12}+r_{13}-r_{23}-r_{123}|_q$); and
  updating said numeric result r by mapping said numeric result r to a rational number using an Extended Euclidean Algorithm (EEA).

3. The method of claim 1 wherein said process of performing on-chain by a calculation node device at least one somewhat homomorphic operation further comprises calculating said result ciphertext multivector ($\overline{C}_R$) as a component-wise addition of coefficients of said message ciphertext multivector ($\overline{C}$) and coefficients of a second ciphertext multivector ($\overline{C}_2$) ($\overline{C}_R=\overline{C}+\overline{C}_2$) available on said distributed ledger/blockchain system such that when said result ciphertext multivector ($\overline{C}_R$) is decrypted, the numeric result r is equivalent to adding unencrypted values represented by said message ciphertext multivector ($\overline{C}$) and said second ciphertext multivector ($\overline{C}_2$).

4. The method of claim 1 wherein said process of performing on-chain by a calculation node device at least one somewhat homomorphic operation further comprises calculating said result ciphertext multivector ($\overline{C}_R$) as a scalar division of all elements of said message ciphertext multivector ($\overline{C}$) by scalar value α ($\overline{C}_R=\overline{C}/\alpha$) such that when said result ciphertext multivector ($\overline{C}_R$) is decrypted, the numeric result r is equivalent to dividing integer message m by said scalar value α.

5. The method of claim 1 wherein said distributed ledger/blockchain system is a private/permissioned system.

6. The method of claim 1 further comprising:
  generating off-chain by said data owner node device a second secret/private key $sk_2$, wherein said second secret/private key $sk_2$ is comprised of a first key multivector ($\overline{K}_{21}$) of said second secret/private key $sk_2$, a second key multivector ($\overline{K}_{22}$) of said second secret/private key $sk_2$, and a second integer $g_2$, such that said second secret/private key $sk_2$ is not equal to said secret/private key sk;
  calculating off-chain by said data owner node device a token t comprised of a first token multivector ($\overline{T}_1$) and a second token multivector ($\overline{T}_2$) as a function of said secret/private key sk and said second secret/private key $sk_2$;
  updating off-chain by said data owner node device said message ciphertext multivector ($\overline{C}$) to be encrypted by said second secret/private key $sk_2$ instead of by said secret/private key sk as a function of said first token multivector ($\overline{T}_1$) and said second token multivector ($\overline{T}_2$) to create a new message ciphertext multivector ($\overline{C}_{new}$);
  transferring off-chain by said data owner node device said second secret/private key $sk_2$ to a new data owner node device through a traditional key exchange protocol;
  submitting on-chain by said data owner node device said new message ciphertext multivector ($\overline{C}_{new}$) as a transaction for said distributed ledger/blockchain system;
  decrypting off-chain by said new data owner node device said new message ciphertext multivector ($\overline{C}_{new}$) as a function of at least one Geometric Algebra geometric product operation of an inverse of said first key multivector ($\overline{K}_{21}^{-1}$) of said second secret/private key $sk_2$, an inverse of said second key multivector ($\overline{K}_{22}^{-1}$) of said second secret/private key $sk_2$, said new message ciphertext multivector ($\overline{C}_{new}$), and a scalar division operation with integer $g_2$ of said second secret/private key $sk_2$ to obtain said message multivector ($\overline{M}$), wherein said new data owner node device has access only to said new message ciphertext multivector ($\overline{C}_{new}$) and not to other data encrypted by said data owner node device with said secret/private key sk.

7. The method of claim 6:
wherein said process of calculating off-chain by said data owner node device said token t further comprises calculating said first token multivector ($T_1$) as $T_1 = \overline{K}_{21} \overline{K}_1^{-1} g^{-1} g_2$ and said second token multivector ($\overline{T}_2$) as $\overline{T}_2 = \overline{K}_2^{-1} \overline{K}_{22}$; and wherein said process of updating off-chain by said data owner node device said message ciphertext multivector ($\overline{C}$) to create said new message ciphertext multivector ($\overline{C}_{new}$) further comprises calculating said new message ciphertext multivector ($\overline{C}_{new}$) as $\overline{C}_{new} = \overline{T}_1 \overline{C} \overline{T}_2$.

8. The method of claim 7 wherein said result ciphertext multivector ($\overline{C}_R$) is processed instead of said message ciphertext multivector ($\overline{C}$).

9. The method of claim 6 wherein operations of each of said data owner node device, said calculation node device, and said new data owner node device are performed by one or more hardware devices as desired by a user.

10. A distributed ledger/blockchain system that performs somewhat homomorphic operations on encrypted data without decrypting said encrypted data and where data resulting from said somewhat homomorphic operations remains encrypted, the distributed ledger/blockchain system comprising:

a data owner node device, comprising a memory comprising computer program instructions for:

generating, off-chain, a secret/private key sk and a public evaluation key pk, wherein said secret/private key sk is comprised of a first key multivector ($\overline{K}_1$), a second key multivector ($\overline{K}_2$), and an integer g, and wherein said public evaluation key pk is comprised of a prime number q;

encrypting, off-chain, an integer message m as a function of at least one Geometric Algebra geometric product operation of said first key multivector ($\overline{K}_1$), said second key multivector ($\overline{K}_2$), and a message multivector ($\overline{M}$), and a scalar multiplication operation with integer g to obtain message ciphertext multivector ($\overline{C}$), wherein said message multivector ($\overline{M}$) is a representation of said integer message m;

submitting, on-chain, said message ciphertext multivector ($\overline{C}$) as a transaction for said distributed ledger/blockchain system; and decrypting, off-chain, a result ciphertext multivector ($\overline{C}_R$) as a function of at least one Geometric Algebra geometric product operation of an inverse of said first key multivector ($\overline{K}_1^{-1}$), an inverse of said second key multivector ($\overline{K}_2^{-1}$), said result ciphertext multivector ($\overline{C}_R$), and a scalar division operation with integer g to obtain a result multivector (R), wherein said result multivector ($\overline{R}$) is a representation of a numeric result r; and, a calculation node device, comprising a memory comprising computer program instructions for:

performing, on-chain, at least one somewhat homomorphic operation with said message ciphertext multivector ($\overline{C}$) to calculate a result ciphertext multivector ($\overline{C}_R$), wherein a smart contract for said distributed ledger/blockchain defines available somewhat homomorphic operations and wherein said calculation node device is part of said same distributed ledger/blockchain system as said owner node device.

11. The distributed ledger/blockchain system of claim 10:
wherein said data owner node device further sets said prime number q equal to a prime number, randomly generates 16 integer values, sets a first 8 of said 16 integer values as coefficient values of said first key multivector ($\overline{K}_1$) wherein said first key multivector ($\overline{K}_1$) has an inverse, sets a last 8 of said 16 integer values as coefficient values of said second key multivector ($\overline{K}_2$) wherein said second key multivector ($\overline{K}_2$) has an inverse, sets said integer g to a random integer value, sets said secret/private key sk to be said first key multivector ($\overline{K}_1$), said second key multivector ($\overline{K}_2$), and said integer g, and sets said public evaluation key to be said prime number q;

wherein said data owner node device further sets coefficients of said message multivector ($\overline{M}$) equal to random integer values except for a $m_{12}$ coefficient of said message multivector ($\overline{M}$), calculates said $m_{12}$ coefficient of said message multivector ($\overline{M}$) as a function of said other coefficients of said message multivector ($\overline{M}$) and said integer message m modulo prime number q ($m_{12} = |-m_0 - m_1 + m_2 + m_3 - m_{13} + m_{23} + m_{123} + m|_q$), calculates a transitional message multivector ($\overline{M}'$) as a scalar multiplication of said integer g and said message multivector ($\overline{M}$) ($\overline{M}' = \overline{M}g$), and calculates said message ciphertext multivector ($\overline{C}$) as a geometric product of said first key multivector ($\overline{K}_1$), said transitional message multivector ($\overline{M}'$) and said second key multivector ($\overline{K}_2$) ($\overline{C} = \overline{K}_1 \overline{M}' \overline{K}_2$); and wherein said data owner node device further calculates a transitional result multivector ($\overline{R}'$) as a geometric product of said inverse of said first key multivector ($\overline{K}_1^{-1}$), said transitional result multivector ($\overline{R}'$) and said inverse of said second key multivector ($\overline{K}_2^{-1}$) ($\overline{R}' = \overline{K}_1^{-1} \overline{C}_R \overline{K}_2^{-1}$), calculates a result multivector ($\overline{R}$) as a scalar division of said integer g and said transitional result multivector ($\overline{R}'$) by said integer g ($\overline{R} = \overline{R}'/g$), calculates said numeric result r as a function of coefficients of said result multivector ($\overline{R}$) modulo prime number q ($r = |r_0 + r_1 - r_2 - r_3 + r_{12} + r_{13} -$; and updates said numeric result r by mapping said numeric result r to a rational number using an Extended Euclidean Algorithm (EEA).

12. The distributed ledger/blockchain system of claim 10 wherein said calculation node device further calculates said result ciphertext multivector ($\overline{C}_R$) as a component-wise addition of coefficients of said message ciphertext multivector ($\overline{C}$) and coefficients of a second ciphertext multivector ($\overline{C}_2$) ($\overline{C}_R = \overline{C} + \overline{C}_2$) available on said distributed ledger/blockchain system such that when said result ciphertext multivector ($\overline{C}_R$) is decrypted, the numeric result r is equivalent to adding unencrypted values represented by said message ciphertext multivector ($\overline{C}$) and said second ciphertext multivector ($\overline{C}_2$).

13. The distributed ledger/blockchain system of claim 10 wherein said calculation node device further calculates said result ciphertext multivector ($\overline{C}_R$) as a scalar division of all elements of said message ciphertext multivector ($\overline{C}$) by scalar value $\alpha$ ($\overline{C}_R = \overline{C}/\alpha$) such that when said result ciphertext multivector ($\overline{C}_R$) is decrypted, the numeric result r is equivalent to dividing integer message m by said scalar value $\alpha$.

14. The distributed ledger/blockchain system of claim 10 wherein said distributed ledger/blockchain system is a private/permissioned system.

15. The distributed ledger/blockchain system of claim 10:
wherein said data owner node device generates, off-chain, a second secret/private key $sk_2$, wherein said second secret/private key $sk_2$ is comprised of a first key multivector ($\overline{K}_{21}$) of said second secret/private key $sk_2$, a second key multivector ($\overline{K}_{22}$) of said second secret/private key $sk_2$, and a second integer $g_2$, such that said second secret/private key $sk_2$ is not equal to said secret/private key sk;

wherein said data owner node device further comprises memory comprising computer program instructions for:

calculating, off-chain, a token t comprised of a first token multivector ($T_1$) and a second token multivector ($T$) as a function of said secret/private key sk and said second secret/private key $sk_2$;

updating, off-chain, said message ciphertext multivector ($\overline{C}$) to be encrypted by said second secret/private key $sk_2$ instead of by said secret/private key sk as a function of said first token multivector ($T_1$) and said second token multivector ($T_2$) to create a new message ciphertext multivector ($\overline{C}_{new}$);

transferring, off-chain, said second secret/private key $sk_2$ to a new data owner node device through a traditional key exchange protocol;

wherein the submission by said data owner node device comprises, on-chain, said new message ciphertext multivector ($\overline{C}_{new}$) as a transaction for said distributed ledger/blockchain system; and said distributed ledger/blockchain system further comprises:

a new data owner node device comprising a memory comprising computer program instructions for decrypting, off-chain, said new message ciphertext multivector ($\overline{C}_{new}$) as a function of at least one Geometric Algebra geometric product operation of an inverse of said first key multivector ($\overline{K}_{21}^{-1}$) of said second secret/private key $sk_2$, an inverse of said second key multivector ($\overline{K}_{22}^{-1}$) of second secret/private key $sk_2$, said new message ciphertext multivector ($\overline{C}_{new}$), and a scalar. division operation with integer $g_2$ of said second secret/private key $sk_2$ to obtain said message multivector ($\overline{M}$), wherein said new data owner node device has access only to said new message ciphertext multivector ($\overline{C}_{new}$) and not to other data encrypted by said data owner node device with said secret/private key sk.

16. The distributed ledger/blockchain system of claim 15:

wherein said data owner node device further calculates said first token multivector ($T_1$) as $T_1 = \overline{K}_{21}\overline{K}_1^{-1}g^{-1}g_2$ and said second token multivector ($T_2$) as $T_2 = \overline{K}_2^{-1}\overline{K}_{22}$; and wherein said data owner device further calculates said new message ciphertext multivector ($\overline{C}_{new}$) as $\overline{C}_{new} = T_1 \overline{C} T_2$.

17. The distributed ledger/blockchain system of claim 16 wherein said result ciphertext multivector ($\overline{C}_R$) is processed instead of said message ciphertext multivector ($\overline{C}$).

18. The distributed ledger/blockchain system of claim 15 wherein operations of each of said data owner node device, said calculation node device, and said new data owner node device are performed by one or more hardware devices as desired by a user.

* * * * *